Sept. 9, 1958            F. S. SMITH            2,851,223
APPARATUS FOR PNEUMATIC MILLING AND CONVEYING OF MILL STOCKS
Filed Nov. 9, 1956            7 Sheets-Sheet 1
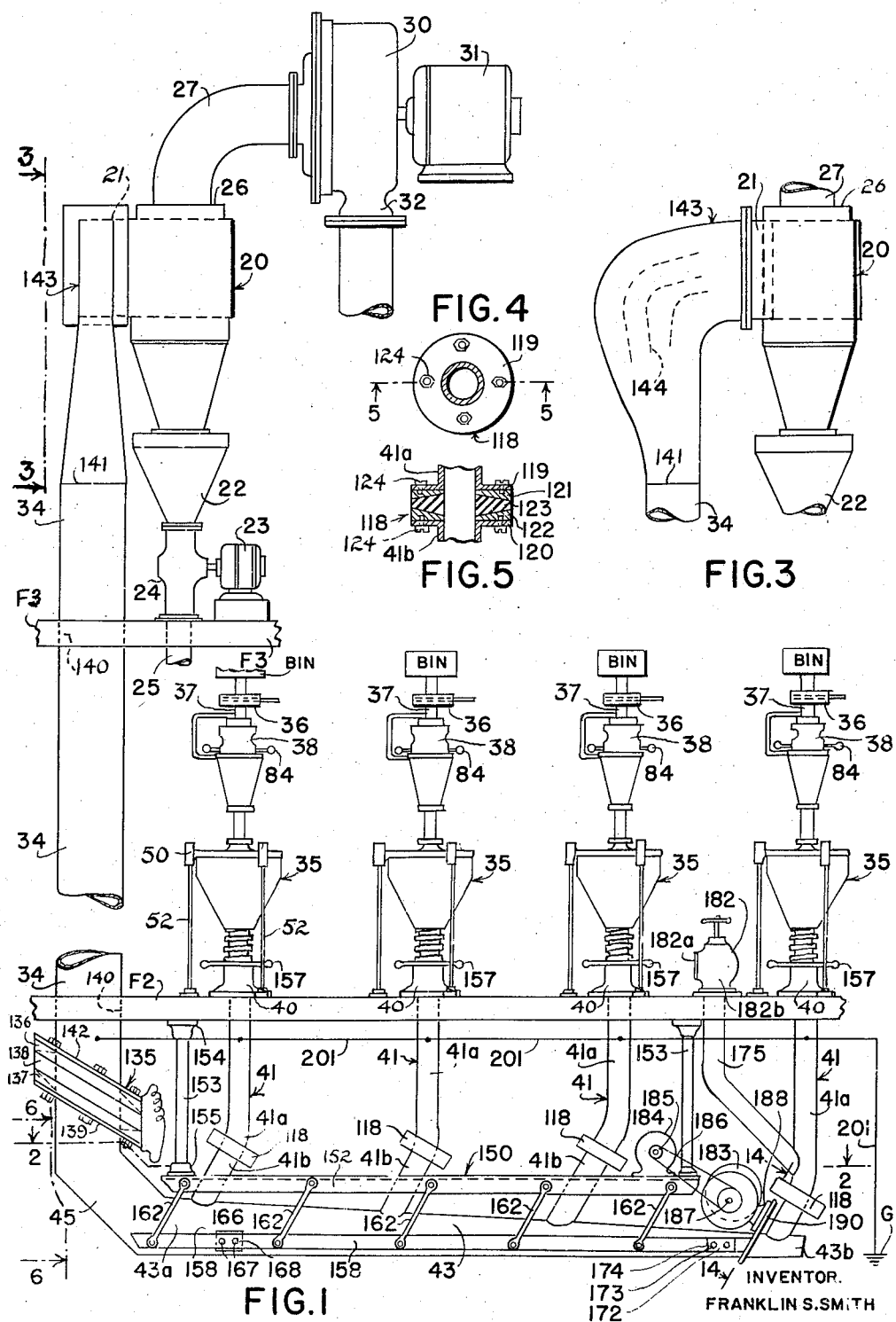
INVENTOR.
FRANKLIN S. SMITH Sept. 9, 1958 F. S. SMITH 2,851,223
APPARATUS FOR PNEUMATIC MILLING AND CONVEYING OF MILL STOCKS
Filed Nov. 9, 1956 7 Sheets-Sheet 2
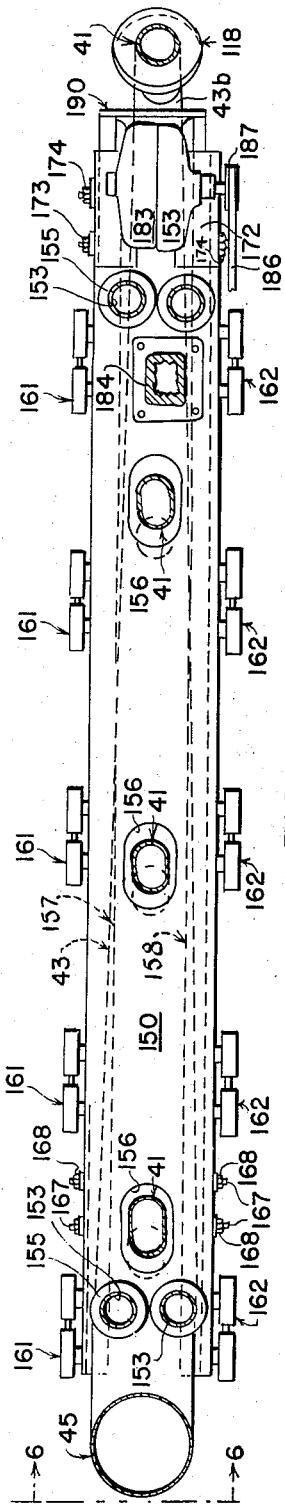
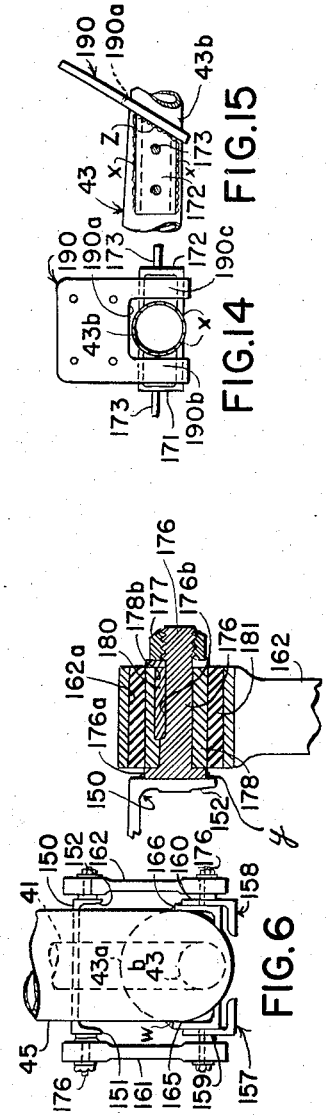
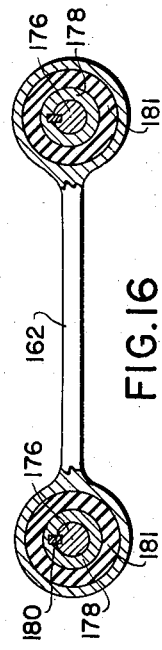
INVENTOR.
Franklin S. Smith
BY
William T. Kiesner
ATTORNEY

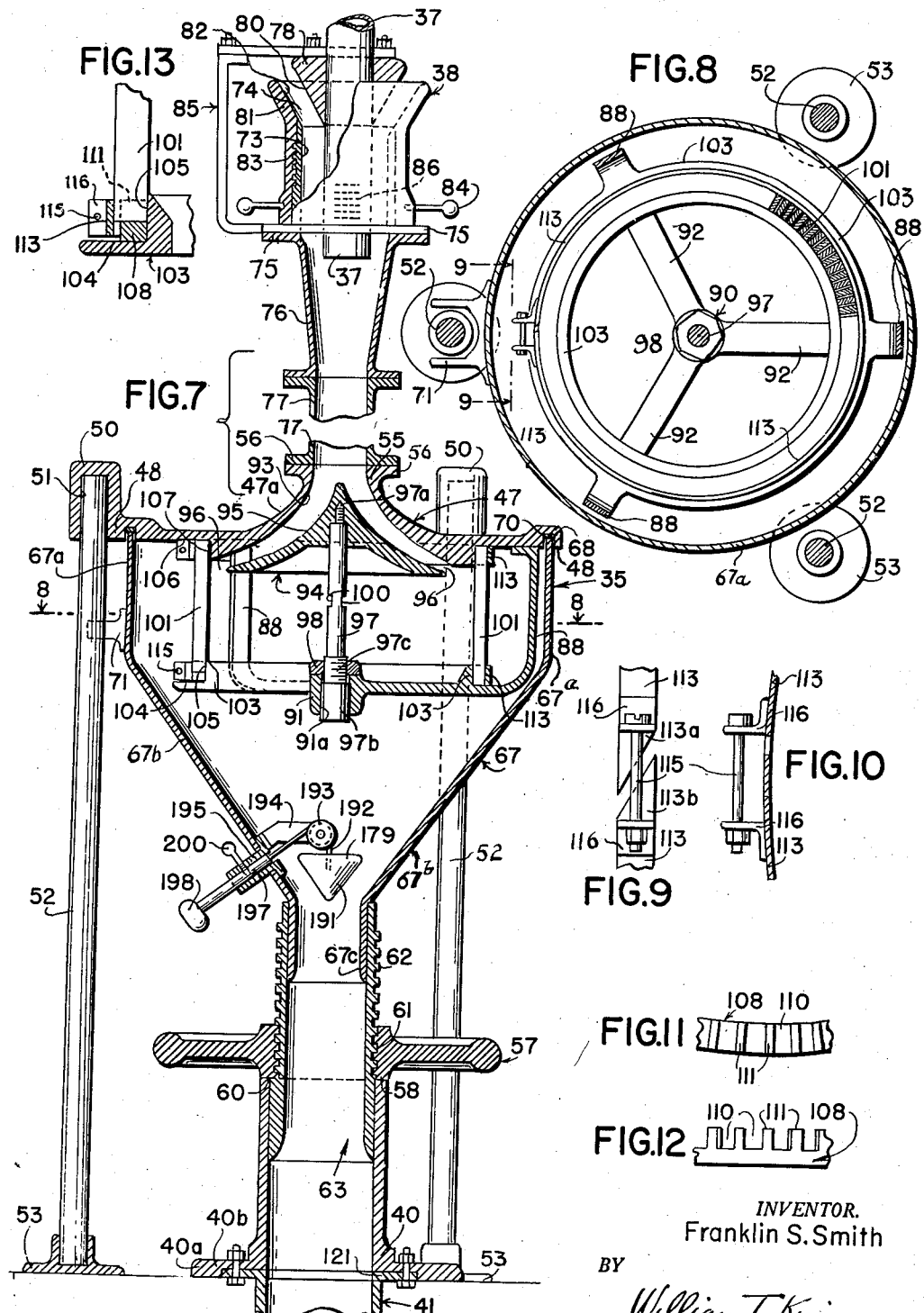

Sept. 9, 1958 F. S. SMITH 2,851,223
APPARATUS FOR PNEUMATIC MILLING AND CONVEYING OF MILL STOCKS
Filed Nov. 9, 1956 7 Sheets-Sheet 4
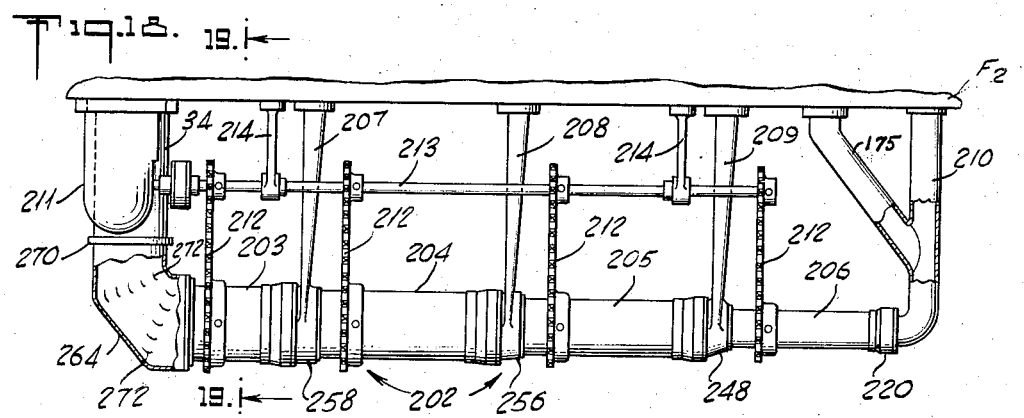
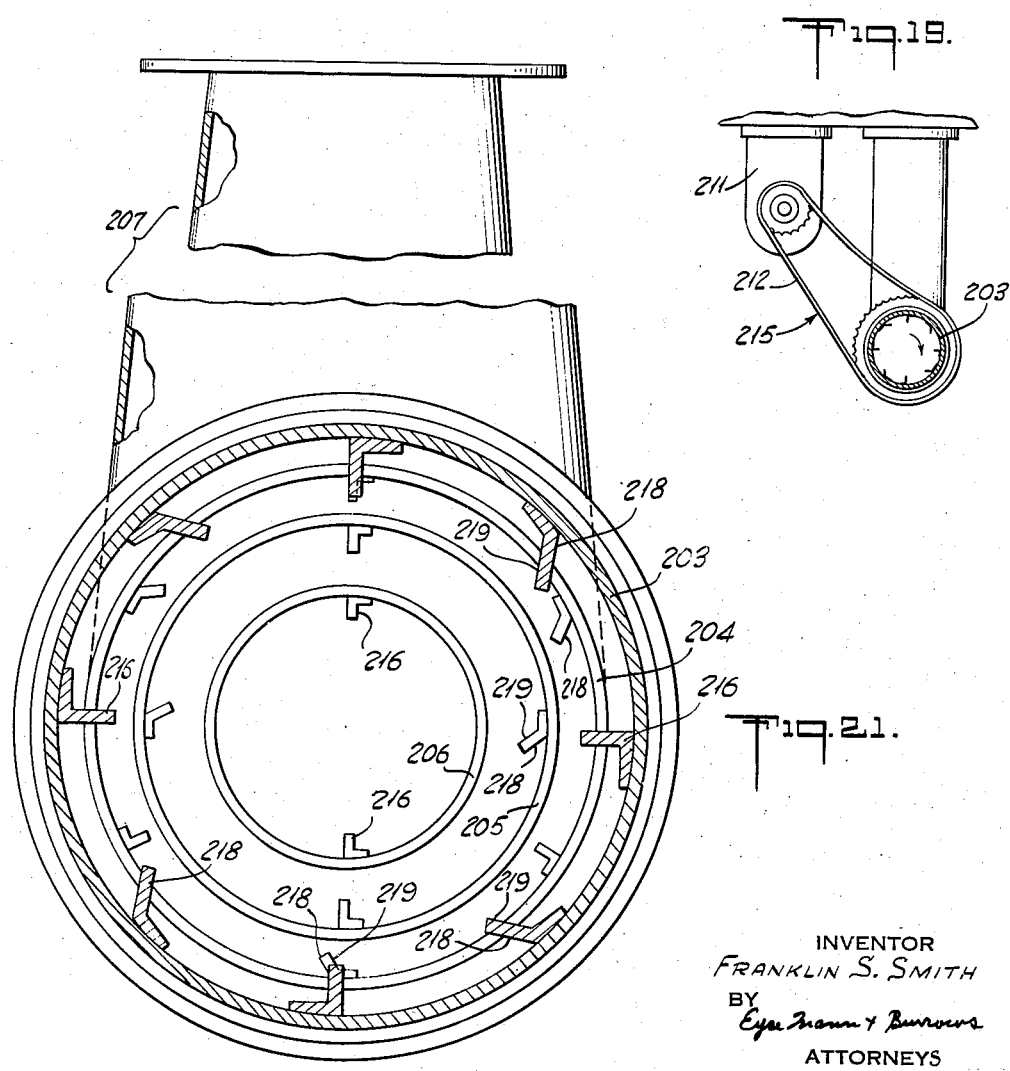
INVENTOR
FRANKLIN S. SMITH
BY
ATTORNEYS

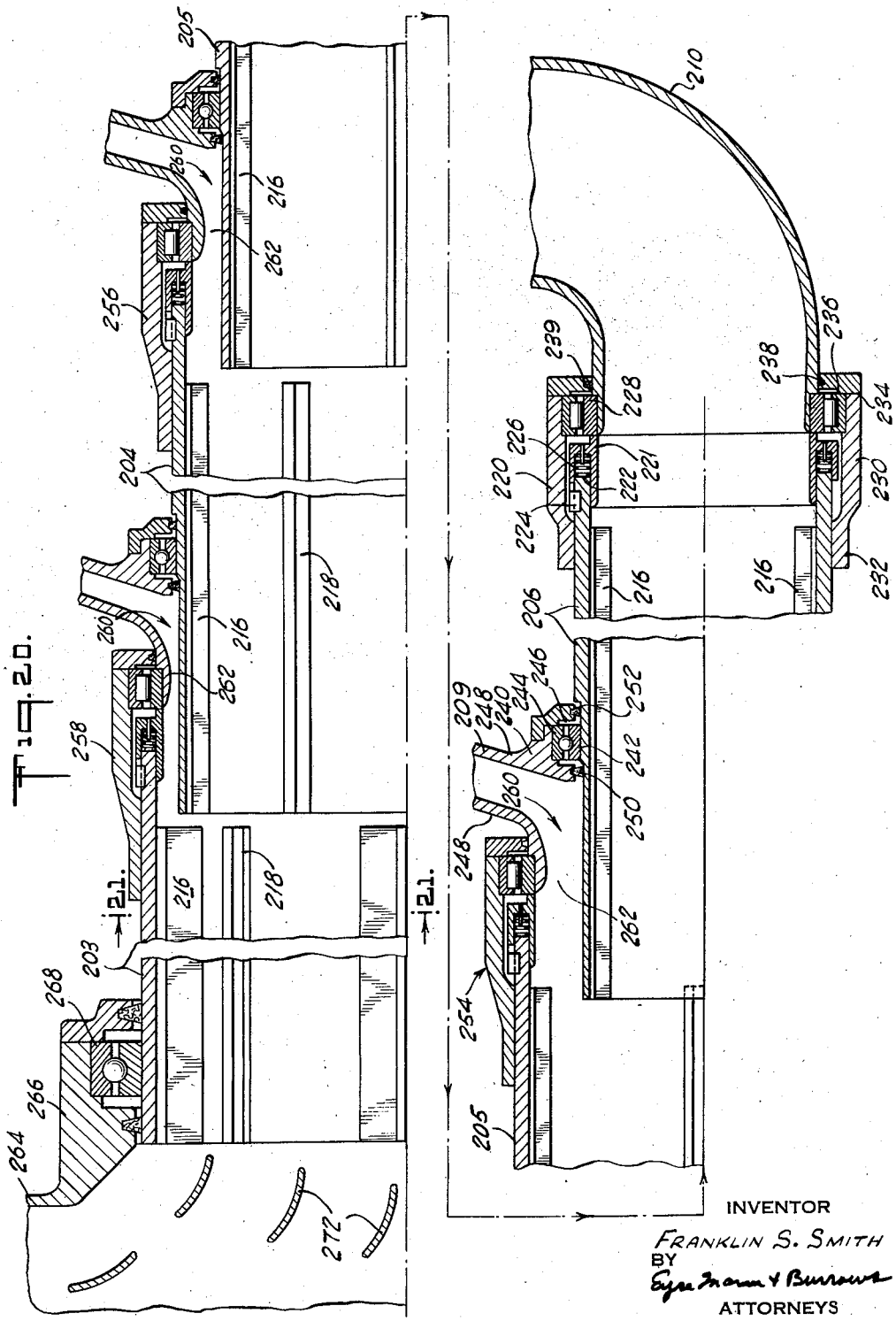

Sept. 9, 1958  F. S. SMITH  2,851,223
APPARATUS FOR PNEUMATIC MILLING AND CONVEYING OF MILL STOCKS
Filed Nov. 9, 1956  7 Sheets-Sheet 6

INVENTOR
FRANKLIN S. SMITH
BY Eyre Mann & Burrows
ATTORNEYS

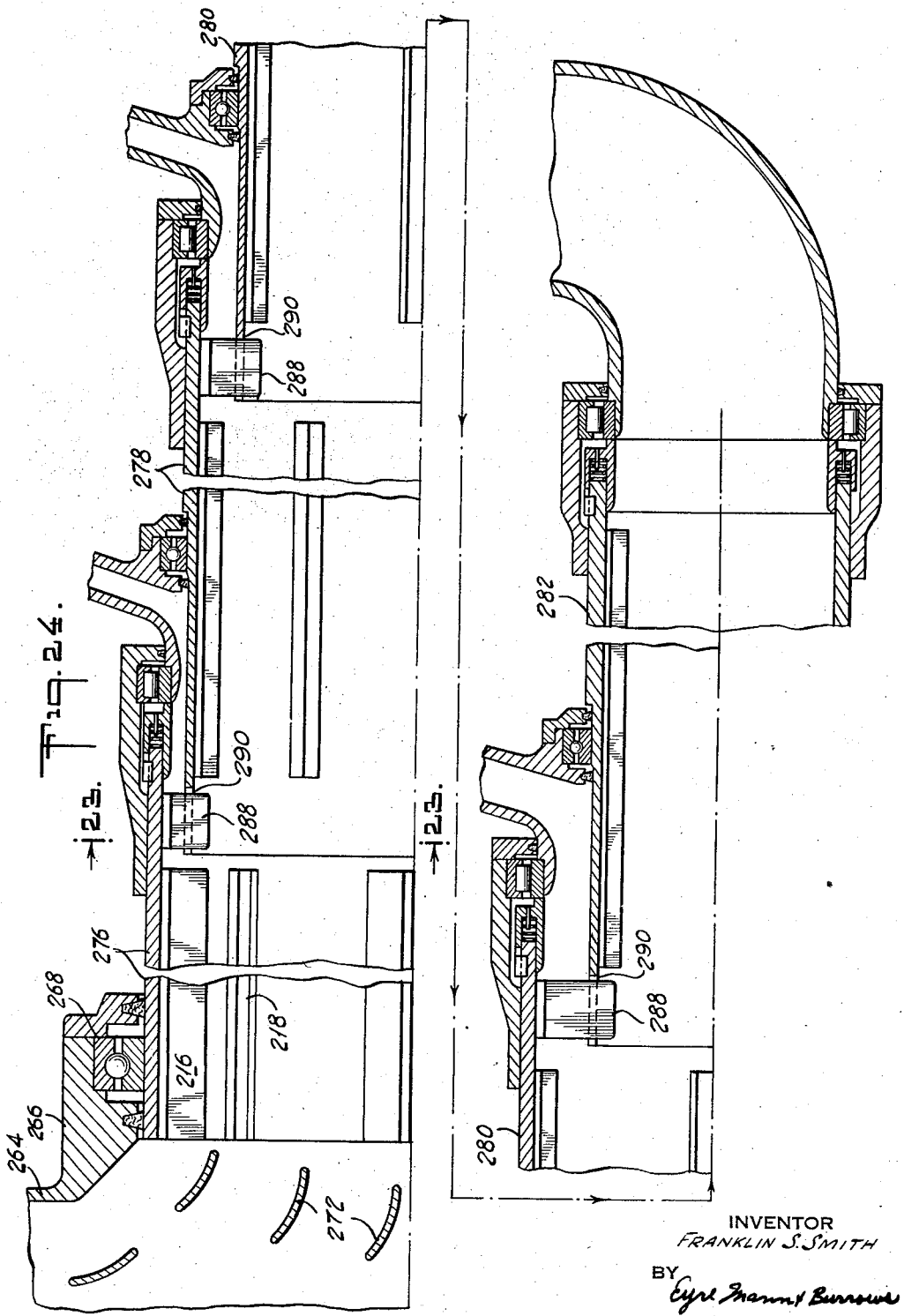

United States Patent Office 2,851,223
Patented Sept. 9, 1958

2,851,223

APPARATUS FOR PNEUMATIC MILLING AND CONVEYING OF MILL STOCKS

Franklin S. Smith, Indian Rocks Beach, Fla.

Application November 9, 1956, Serial No. 621,493

62 Claims. (Cl. 241—40)

This invention relates to a pneumatic system and apparatus for the improved and for more efficient handling, impact-milling and other treatment, and conveying or elevating of products and their components in a flour mill or the like.

Various attempts have heretofore been made to utilize, in a flour mill, pneumatic conveying of mill products, particularly in the endeavor to do away with mechanical bucket types of elevators, with their many recognized disadvantages, heretofore practically universally employed and still widely employed; however, various shortcomings, obstacles, or handicaps exist or are inherent in such known mill systems seeking to achieve product-conveying pneumatically and as a result various of the many recognized or hoped-for advantages of pneumatic mill conveying or elevating cannot be achieved or are only partially achieved or are accompanied by inefficiencies or costly complications or by uneconomic utilization of space or by high power consumption or the like.

One of the objects of this invention is to provide a system and apparatus that will avoid or materially alleviate such disadvantages or handicaps of such prior attempts and that will efficiently facilitate achievement, in a flour mill and by relatively simple and thoroughly practical pneumatic means, of advantages heretofore only partially or not at all achieved. Another object is to provide a pneumatic system and apparatus of the above-mentioned character that will be more reliable and dependable and moreover well and flexibly adapted to meet, particularly with respect to available or planned mill space, varying conditions or requirements met with in practice. Another object is to provide a system and apparatus of the above-mentioned character by which more efficient use may be made of the several floors of a mill building, thus improving the space factor, and at the same time provide for good mechanical efficiency and high reliability of operation.

Another object is to provide a system and apparatus of the above-mentioned character in which the number of power drives, heretofore found necessary in known systems, can be reduced in number and thereby over-all efficiency improved, first-cost reduced, and problems and cost of maintenance also lessened.

Another object is, in such a system and apparatus, to provide an over-all mode of operation, with dependable coactions between or amongst various of the elements or parts or apparatus of the system, that will materially simplify the system and its installation and also make for wider utilization and functioning of the air or air stream of the pneumatic system. Another object is to carry out this last-mentioned object in a manner that facilitates reduction of the number of moving parts in the system; more particularly and also, to provide, in coaction with the conveying or elevating air or air stream, a pneumatic product-impactor that can be free of moving or driven operating parts, and to provide simple and practical interrelated controls whereby to facilitate cutting-in or cutting-out one or more of any suitable number of such pneumatic impactors incorporated in the system, while maintaining effective conveying or elevating action of the air stream in spite of such variation or variability in quantity of material or stock to be conveyed or elevated and also maintain the desired rate and volume of impact-producing air flow through the pneumatic impactors even though the number of the latter that are effective may be changed. Another object is to provide, in such a system, for the maintenance, by simple and practical means, of the desired volume and velocity of air flow for maintaining conveyance or elevating of the milled or comminuted material even through one or more of the pneumatic impactors is temporarily or permanently cut out of the air-flow circuit or path. Another object is to provide, in such a system, compact and dependable means adapted to coact, with the conveying air or air stream and its conduits, in maintaining movement of the milled product and thereby make less critical the effects of variations such as those that accompany cutting-in or cutting-out of one or more of the pneumatic comminutors or impactors, whereby also interrelated controls, such as those above mentioned, may be operated or actuated with greater facility and convenience than might otherwise be possible.

Another object is to provide a pneumatic conveyor and elevating system for milled products and a pneumatic product comminutor or impactor adapted for advantageous functional and structural interdependence upon one another and mutually operating and coacting to achieve more efficient flour mill operation and to effect material economy in installation and in maintenance; another object is to provide such a conveying and elevating system and pneumatic comminutors or impactors adapted for such interdependence of functioning and of structure as aforesaid, and to provide them with practical, dependable, and relatively simple means for insuring dependability of their interdependent coactions under varying requirements of installation, or changeable or varying capacities or load of product milling, or the like.

Another object is to provide a system and apparatus of the above-mentioned character in which the many advantages, including economy of power consumption, of utilizing low velocity of air for conveying and elevating the mill product may be realized along with other practical advantages such as superior dependability of operation, attainment of longer life of the installation and particularly of conveying conduits thereof and the like, lower maintenance and replacement costs, improved cleanliness, and improved or more uniform air flow with consequent improved efficiency in maintaining conveyance and elevating of the mill material or stock. Another object is to provide, in such a low air-velocity or low-pressure system, a pneumatic product-impactor functioning at high air-velocity, with the low-velocity conveyor and elevating system mutually operating so that the low air-velocity of the one and the high air-velocity of the other are dependably achieved and maintained without the one detrimentally affecting the other.

Another object is to provide a pneumatic product impactor, utilizing air of relatively high velocity as a propellant for impacting the mill stock, so constructed and operating that it can be readily incorporated into a low-velocity pneumatic stock conveyor or elevating system and utilize the air stream of the latter. Another object is to provide a pneumatic impactor of the just-mentioned character that will be of dependable and thoroughly practical construction and of ease and facility of control in operation and of simple and practical accessibility to its interior parts, as for adjustment or setting or replacement of parts, as well as for cleaning. Another object is to provide a conduit system for pneumatically conveying and elevating mill products or stocks particularly at low air-velocities and capable of eliminating or materially alleviating detrimental sliding friction between the product particles and the conduit walls and provided with practical and reliable means for coacting to maintain the stock and its components or particles in substantial suspension in the moving air. Other objects are, in general, to provide an improved and reliably effective low-velocity pneumatic system for conveying or elevating mill products and with which a product-impactor can dependably coact to facilitate achievement, in practice, of economy and other advantages in the utilization of relatively low velocity of air movement.

Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings in which is shown an illustrative embodiment of the mechanical features of my invention, Figure 1 is a front elevation, certain parts being omitted or shown diagrammatically, of a mill installation showing one of various possible arrangements of my pneumatic product comminutor or impactor and pneumatic conveyor and elevating system, thereby to illustrate one form of structural interrelationships of certain parts for achieving mutually interdependent coactions throughout;

Figure 2 is a horizontal view, on an enlarged scale, as seen along the line 2—2 of Figure 1;

Figure 3 is a detached or fragmentary elevation as seen from the left, as along the line 3—3 of Figure 1;

Figure 4 is a top plan view of a vibration-damping conduit-coupling;

Figure 5 is a central sectional view thereof as seen along the line 5—5 of Figure 4;

Figure 6 is a detached fragmentary end elevation, as seen from the left in Figures 1 and 2, as along the line 6—6 thereof, showing certain features of a vibratable or oscillatable support for certain portions of the system, certain parts being omitted;

Figure 7 is a central vertical sectional view, on an enlarged scale, of one of the pneumatic impactors that form part of the system shown in Figure 2;

Figure 8 is a horizontal sectional view as seen along the line 8—8 of Figure 7;

Figure 9 is a side elevation, as seen along the line 9—9 of Figure 8, showing on an enlarged scale certain details of a device for coacting in the assembly of removable target elements;

Figure 10 is an elevation as seen from the right in Figure 9;

Figure 11 is a detached fragmentary view, on enlarged scale, of a target-element positioning ring;

Figure 12 is a view thereof as seen from the bottom in Figure 11;

Figure 13 is a detached fragmentary view, on enlarged scale, showing certain details of assemblage of a target element relative to one of its ring supports;

Figure 14 is a detached elevation, as seen along the line 14—14 of Figure 1, of a saddle-plate assembly for supporting a vibrator or reciprocator device;

Figure 15 is an end elevation thereof, as seen from the right in Figure 14;

Figure 16 is a detached elevation, on a much enlarged scale, of a suspension arm employed in pairs;

Figure 17 is a central vertical sectional view, on an enlarged scale, through the upper end of one of the suspension arms, illustrating a preferred construction for both ends of such arms;

Figure 18 is a front elevation of another form of horizontal manifold for pneumatic conveying of mill stock;

Figure 19 is taken on line 19—19 of Figure 18;

Figure 20 is a vertical sectional view through the common axis of the horizontal manifold of Figure 18;

Figure 21 is taken on line 21—21 of Figure 20;

Figure 24 is a vertical sectional view through the common axis of the horizontal manifold of Figure 22.

Similar reference characters refer to similar parts throughout the several views of the drawings.

Figure 22:
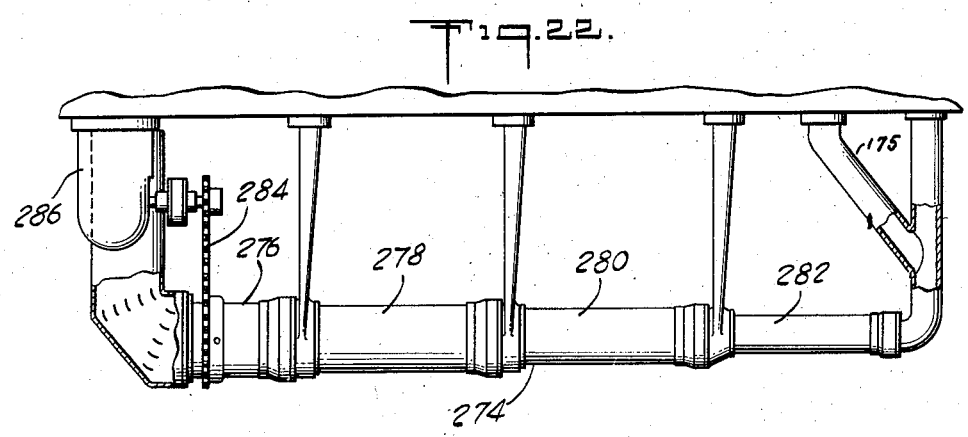
Figure 22 is a front elevation of still another form of horizontal manifold for pneumatic conveying of mill stock.

Referring first to Figure 1, I have there diagrammatically indicated several floor levels of floors of a mill, illustratively two in number as at $F^2$ and $F^3$, the bottom floor not being shown; these will suffice to illustrate one of various possible mill structures and with them to illustrate one of various possible arrangements and relative dispositions relative thereto, according to my invention, of the various coacting parts and apparatus for achieving, in accordance with the principles of my invention, effective pneumatic mill operation including interdependent pneumatic comminution or impacting of the product and pneumatic conveying and elevating thereof and of its comminuted and other components. On an upper floor, such as floor $F^3$, there is located a cyclone separator 20, of any suitable or known type or construction provided with an intake 21 for receiving milled product and air, as is later described, and provided at its lower end with a collecting hopper 22 into which the milled product, separated from the air, falls and from the lower end of which the product may be removed by a rotary valve and air seal of any suitable or known type, as indicated at 24, and suitably driven as by a gear-head motor 23. Valve 24 leads to a conduit 25 by which the milled product may be conveyed, as by gravity feed, for further treatment or packaging or the like.

The air, from which the cyclone separator 20 separates the mill product, exits from the separator 20 by way of an outlet 26 to which is connected a conduit 27 that leads to the intake of a blower 30, driven by any suitable means such as a motor 31; the blower 30 exhausts through its outlet 32, to the atmosphere either directly or through a suitable dust separator (not shown). The intake 21 of the cyclone separator 20 is connected, by means later described, to a vertical conduit 34, preferably of circular cross-section, which extends downwardly through as many floors of the mill building, illustratively the two floors $F^3$ and $F^2$, as are necessary to bring its lower end below the floor, floor $F^2$ in the illustration, on which it is desired to locate the pneumatic impactors which are to coact, to effect comminution of the product, with the air that is maintained in motion by the cyclone-separator exhaust blower 30 and which are also made to coact therewith and with other parts to maintain air movement in appropriate volume and velocity for effecting continuity of conveying and of elevating of the comminuted product, throughout changing conditions such as change in the number of pneumatic impactors operating at any given time. In Figure 1 I have shown, by way of illustration, four pneumatic impactors, each designated as a whole by the reference character 35, suitably aligned on floor $F^2$ and each provided with a product-intake conduit or spout 37 leading, through a suitable valve 36, from a suitable bin or bins (diagrammatically indicated) and each provided and with an adjustable air-intake valve generally indicated by the reference character 38 which provides, as later described, an annular air inlet that is coaxial and concentric with the product-intake spout 37. Each pneumatic impactor 35, structurally described in detail later, is totally enclosed and terminates at its lower end in an outlet, for air and comminuted product, which is preferably in the form of a relatively heavy sleeve 40 that is secured to the floor F² as by cap screws or bolts and which is provided with suitable means at its underface for connecting thereto a discharge conduit 41, which passes downwardly through floor F²; conduit 41 may be round in cross-section and at its lower end connects with and discharges into a substantially horizontally disposed manifold 43 of special construction and coactions and which underlies the aligned pneumatic impactors 35 on the floor F² above so that all of the discharge conduits 41 can discharge into the manifold 43 which at its left end, is connected, preferably by means later described, to the lower end of the vertical or elevating conduit 34. Adjacent its right end, the horizontal manifold portion 43 of the system is provided with suitable means, later described, for compensatingly controlling ingress of air thereto, preferably in a manner to facilitate correlation thereof with the controls or actuation of the air-inlet valves 38 of the respective pneumatic impactors 35, 35, 35, etc.

Horizontal manifold 43 is preferably of circular cross-section; at its left end portion 43ᵃ (see Figure 2) its cross-section can be and preferably is the same as that of the vertical conduit 34 as is also the cross-section of the angled turn 45 which forms the connection between manifold 43 and elevator conduit 34. It is in these successive parts 43ᵃ, 45, and 34 that air of relatively low velocity is moved in the direction of the order in which these parts have just been named, by the suction or exhaust effects caused by the blower or fan 30 connected to the air outlet 27 of the cyclone separator 20. This air, carrying the impacted mill product or stock and its particles, is supplied at low velocity from the high-velocity pneumatic product impactors 35, 35, etc. by way of the respective connecting or discharge conduits 41 of the latter, conduits 41 being of the same cross-section (where the impactors 35, 35, etc. are of the same capacities) and they are connected to the floor-underlying manifold 43, as shown in Figures 1 and 2, at points or locations spaced lengthwise of the latter, illustratively at horizontal spacings commensurate with the spacing of the impactors 35, 35, etc. on floor F² above; in order to avoid abrupt or detrimental velocity changes in and along the horizontal manifold 43, the latter is varied, as indicated in Figure 2 and as is later described in detail, in its cross-section so that the latter increases from its right-hand or dead end, near which one endmost impactor 35 discharges into it, as necessitated by the number of impactor-discharge conduits 41 that successively enter the manifold 43. Conveniently, the individual connecting conduits 41 can be given a slight bend or turn, at an obtuse angle as indicated in Figure 1, so that the stock-carrying air, as it exists therefrom and enters the horizontal manifold 43, can have a substantial component of movement, as do also the product particles, in the direction of flow (to the left) in the manifold 43. Air intake for these purposes is by way of the controllable air-inlet valves 38 at the upper ends of the pneumatic impactors and, as above indicated, constructed to provide an annular inlet passage, from the atmosphere, that is coaxial and concentric with the mill product supply spout 37. Air inflow to each impactor is thus induced, under the control of the valve 38, by the remote blower 30, the air entering the impactor and comingling with the mill product discharged from the supply spout 37, whence, for and within each impactor 35, the air flow with the supplied mill stock is converted to a high-velocity flow for impacting the product entities or components at sufficient velocity, and thereupon the velocity of air flow, within each impactor, is reduced materially to relatively low velocity of movement of the air and of the product particles carried by it for discharge through the respective connecting conduits 41 into the horizontal manifold 43.

It will therefore be helpful, at this point, to describe the construction and action of the impactors 35 by which such mode of operation and coaction with the remote suction blower 30 and with intermediate parts and devices are achieved. Turning therefore to Figure 7, the impactor comprises a relatively heavy top casing member 47 having a circular peripheral flange 48 from which project, radially, three equiangularly spaced brackets 50 which, in horizontal section, are round in cross-section and extend upwardly from the plane of the underface of the top casing part 47, being bored out from their under ends to form sockets 51 in which are received and secured the vertical standards 52, preferably tubular for lightness and strength; supports 52 are fitted at their lower ends with floor flanges 53 by which they may be anchored to the floor in any suitable manner, standards 52 being of substantial length so as to support the top casing part 47 well up from the floor and dependably hold it against movement or displacement. Top casing part 47 has, at its center and positioned upwardly from its plane, a round entry passage 55 about which extends a conduit-coupling flange 56 for the connection thereto, as later described, of means for supporting and controlling the air-inlet valve 38 and for interrelating the valve 38 coaxially with the product spout 37. The sleeve 40, secured to the floor F², as above described, is located coaxially with the intake opening 55 of the top casing part 47 and at its upper end rotationally supports a relatively large-diametered hand-wheel 57; its rim can be of a relatively large radius for ease of turning leverage and of manual manipulation and falls within the circle on which the equiangularly spaced vertical standards 52 are positioned (see also Figure 8).

Suitable bearing means are provided between the hand-wheel 57 and the heavy sleeve 40 and they may comprise, conveniently, coacting annular faces 58 and 60 which are provided respectively on the hub of hand-wheel 57 and in the upper end face of sleeve 40. The hub of hand-wheel 57 is internally threaded as at 61 and receives therein the external threads 62 of a heavy tubular or sleeve-like member 63 which at its upper end has secured thereto and supports the lower casing part 67, later described, and which is companion to the upper casing part 47. The threads 62 on supporting sleeve 63 are preferably square, being formed in the external cylindrical face of sleeve 63 that is finished off for a sliding fit within the bottom sleeve 40 which internally is finished off to form a bearing and guiding surface for the sleeve 63. The threads 62 preferably do not extend to the lower end of sleeve 63, substantially as indicated in Figure 7, so that the range of upward movement of the casing-supporting sleeve 63 in response to turning of the hand-wheel 57 is limited and thereby to retain a substantial lower end portion of sleeve 63 within the bottom sleeve 40 and thus maintain the desired coaxial support of the lower casing part 67 from the bottom sleeve 40. Lower casing part 67 is thus always dependably supported in coaxial alignment with other parts, vertical load or thrusts being transmitted to the bottom floor sleeve 40 through the bearing 58—60.

Lower casing part 67 has an upper cylindrical portion 67ᵃ that represents an upper annular end face with which an annular grove 68 in the underside of the top casing part 47 is juxtaposed; seated in groove 68 is a gasket 70 forming a seal with the annular upper end face of the lower casing section 67 when the latter is moved upwardly to enter the groove 70 and becomes pressed against the gasket 70. Casing portion 67ᵃ, at its lower end, merges into a frusto-conical or hopper-like portion 67ᵇ that terminates at its lower end in a cylindrical part 67ᶜ which forms an exit passageway for air and the mill stock and which is secured in any suitable manner, as by force-fitting, to the casing-support sleeve 63, the latter and the floor sleeve 40 forming a continuation of that exit passageway and leading to the impactor-discharge conduit 41 (Figure 2) that connects to the horizontal conduit 43.

A U-shaped bracket 71 (Figures 7 and 8) secured to the upper cylindrical casing portion 67ᵃ receives between its arms one of the upright standards 52 along which it can slide during vertical movement of the lower casing part 67 in response to actuation of the hand-wheel 57, holding the casing part 67 and its support-sleeve 63 against rotation about the vertical axis as the hand-wheel 57 turns in one direction or the other according as the lower casing 67 is to be lowered or raised back into operating position.

As above indicated, the mill product, after impacting thereof in the impactor 35 under conditions of high-velocity movement of both air and mill product or mill stock, leaves the impactor 35 at low velocity, by the discharge passageway above described, that is, at the lower end of the lower casing part 67. The high velocity air flow and movement of the mill stock for impacting of the latter within the impactor 35 is achieved in coaction with the air-intake valve 38 above mentioned. Valve 38, as is better shown in Figure 7, comprises a tubular member or sleeve 73 of an internal diameter materially greater than the outside diameter of the product pipe or spout 37 so as to form an annular passageway 74 about the latter; valve sleeve part 73 is provided at its lower end with a flange 75 whereby it is connected to a suitably flanged tapered conduit section 76 so that with flanged conduit 77 connection is made to the connecting flange 56 of the upper casing part 47, thereby also aligning the several parts coaxially and coaxially also with the fixed mill stock spout 37, substantially as shown in Figure 7. The mill stock spout 37 passes through an upper valve seat 78; the latter is in the form of an annulus provided with an external frusto-conical or tapering face 80 and coacting with the latter is an annular valve part 81 that extends about it and that is provided with a frusto-conical or tapered internal face 82 of about the same slope as the external frusto-conical face 80 of valve 78. A sturdy bracket structure 85, having a vertical arm at one side, supports valve seat number 78 from the flange 75 and holds it coaxial with its coacting parts. Valve part 81 is preferably integrally formed with an internally threaded sleeve 83, the threads of which mate with the external threads of the internal sleeve 73 so that by turning the external sleeve 83 which is provided with suitable handles or spokes 84, the external valve part 81 can be raised or lowered relative to the internal valve part 78 and the spacing between valve surfaces 82 and 80 and hence the valve opening changed at will.

In the position shown in Figure 7, with the screw-threaded rotatable part 83 in lowermost position, that is, bottoming against the flange 75 of the inner sleeve member 73, the valve opening of air-inlet valve 38 is maximum, the spacing between the frusto-conical valve faces 82 and 80 being greatest, so that air intake, as induced or affected by the exhaust blower 30 (Figure 1) at the other end of the system and as affected by other parts in the path of air flow, can be maximum; as later described, particularly in connection with the settings of parts within the impactor 35, this maximum valve opening of valve 38 is appropriate for achieving maximum high velocity of product-impacting within the impactor.

The annular air-inlet opening of valve 38 may be lessened by turning the outer valve part 83 so as to raise it and thus lessen the radial dimension of the spacing between the valve faces 82 and 80; the threaded relationship of the parts is advantageous in achieving change in valve opening in fine gradations and preferably the valve structure is provided with indicia to indicate valve opening and such indicia may be calibrated and set forth in any suitable terms. In Figure 7 these indicia are generally indicated at 86 in the form of calibrations provided on the outer face of the fixed inner sleeve 73 relative to which the rotatable outer sleeve part 83 moves up and down according to the direction in which it is turned, the valve opening being indicated by the position of the lower plane edge of the outer sleeve 83 relative to the calibrations 86.

Depending upon various factors such as the character of the mill stock to be comminuted (wheat, corn, etc.) or such as prior tempering as well as variety of the stock, the high velocity for impacting or comminuting will vary; it also has to be varied according as the product is subjected to its "first break" or to some succeeding break, the air velocity for impacting it being increased with successive breaks. For achieving, within the impactor 35, the desired air and impacting velocity, air-intake valve 38 is set or adjusted in correlation with the setting of parts within the impactor to which access is readily gained by turning the hand-wheel 57 (Figure 7) to withdraw the lower casing part 67 downwardly and well away from the fixed upper casing part 47. These internal parts may now be described.

Depending from the underside of the top casing part 47 and suitably secured thereto are the vertical arms 88 of a spider frame 90 (see also Figure 8) that has a central hub 91 and horizontally extending arms 92 of which the arms 88 are vertical extensions as shown; the latter are positioned relatively close to the cylindrical portion 67$^a$ of the lower casing part 67 when the latter is positioned in sealed connection with the upper casing part 47. Hub 91 is in this manner supported considerably below but coaxially with the round flanged intake opening 55 of the upper casing part 47, the latter being conformed, as at 47$^a$, to merge its underface or wall in a curved surface of revolution 93, upwardly and toward the axis to terminate in the round intake opening 55; this internal and downwardly diverging surface 93 may be somewhat cycloidal and it is to coact to materially increase, to the desired high velocity for milling or comminuting the product, the velocity of the air and the product entering the intake opening 55, air and product being initially comingled as the product discharging from the spout 37 enters the stream of air passed by the set valve opening of valve 38 into the conduit section 76. Coacting with this curved surface 93 of upper casing portion 47$^a$ is a conoidal member 94 that is of substantial radius at its outer periphery and whose upper surface 95 is preferably a cycloid of relatively rapid descent. Conoidal member 94 is mounted so that its cycloidal surface 95 is coaxial with curved surface 93 to form therebetween, as indicated in Figure 7, a velocity-increasing nozzle with the peripherally continuous outlet 96, the two coacting surfaces forming a passageway which, while annular in horizontal cross-section, decreases in cross-section traversely to the direction of flow so as to relatively rapidly increase the velocity of air flow while at the same time changing the direction of flow so that the discharge of air and product through the peripherally continuous outlet 96 is substantially radial. Moreover, I mount the conoidal member 94 so that I may change its action in effecting such increase in air velocity as the air and product move from the intake opening 55 to the peripheral outlet 96 and this I preferably do by raising or lowering the conoidal member 94 to change the relation between the coacting curved surfaces 95 and 93.

For this purpose, an illustrative and preferred construction comprises a suitably heavy stud shaft 97 (Figure 7) which at its upper end has the conoidal member 94 axially secured thereto in any suitable manner, as by seating a portion of the shaft end, with a sliding fit, into a coaxial bore in the underside of the hub of member 94 and providing a reduced threaded end portion 97$^a$ on the shaft threaded into a correspondingly threaded counterbore in the hub, substantially as shown. In this manner also the conoidal member 94 may be readily replaced.

The hub 91 of the spider frame 90 is preferably of substantial axial dimension and is bored out as as 91$^a$ to slidably receive the larger-diametered end part 97$^b$ of shaft 97, the latter having an intermediate threaded portion 97$^c$ of intermediate diameter to receive a nut 98 whose underface rests flatwise in engagement with the upper flat end face of the spider hub 91. At a suitable point in its length shaft 97 is provided with opposed flats 100 to facilitate application of a wrench to hold the shaft against rotation as the nut 98 is turned as with a wrench, to thereby raise or lower the conoidal member 94 to provide the desired dimensional spacing between the conoidal surface 95 and the curved surface 93, all without disturbing the coaxial relationship between the two. Or, the nut 98 may be held against rotation and the shaft 97 with conoidal member 94 turned, to achieve the desired setting of the nozzle. These parts, furthermore, serve other purposes later described.

In the path of the substantially peripherally continuous and radially outward high-velocity movement of the mill stock and air from the peripheral nozzle outlet 96, I position a coaxial and concentric circular array of spaced target members 101 which preferably extend vertically and are preferably of substantial vertical dimension compared to the general vertical dimension of the high velocity air and product discharge from the peripheral nozzle outlet 96, being spaced radially from the latter about as indicated in Figure 7 and so as to avoid substantial loss in velocity of the product entities or particles before they strike the upper portions of the inner vertical and preferably flat faces of the circularly aligned target members 101 (see also Figure 8). Target members 101 are preferably rectangular in cross-section (see Figure 8) and are made of any suitable relatively hard and good wear-resisting material, such as bonded or sintered alumina, silicon carbide, boron carbide, or the like and in such case they lend themselves readily to quantity and uniform production as by molding. They are mounted in position by means that facilitate not only their assembly in concentric relation to the nozzle outlet 96 but also their rearrangement to present unworn faces thereof to the discharged product and in the illustrative embodiment about to be described, each target member 101, where it is of rectangular cross-section, can be made to provide four wear-resistant impact areas, thus making each target member last four times as long.

The horizontal arms 92 of the spider frame 90 (Figures 8 and 7) carry or have integrally formed therewith a ring frame 103 which is turned or formed to provide a horizontal seat 104 (see also Figure 13) and a vertical seat 105 which are circumferentially continuous. Vertical seat 105 is of a radius equal to the radius at which it is desired to position the vertical impact faces of the targets 101. The underside of the upper casing part 47 is turned or suitably formed to provide corresponding and juxtaposed seats, namely, a horizontal annular seat 106 and a vertical cylindrical seat 107 (Figure 7), the latter being of the same radius as seat 105 provided in the ring frame 103 just described. The upper seats 106—107 are readily formed or provided because of the increasing cross-section of metal employed, in this illustrative embodiment, in forming the surface of revolution 93 as indicated in Figure 7.

Into each of the right-angles formed by the seats 104—105 and 106—107 is fitted and suitably secured a target-spacer ring 108 (see also Figure 13); each spacer ring is generally rectangular in cross-section and on one annular face thereof it is radially slotted as at 110 (see Figures 11 and 12), the slots 110 being parallel-sided and of a width equal to the smaller dimension of the rectangular cross-section of the targets 101 and the radial dimension of the ring being materially less than the longer dimension of the target cross-section as is better shown in Figure 13. Illustratively the width of the slots 110 can be on the order of 0.25 inch. As is better indicated in Figure 11 the upstanding parts 111 that intervene successive slots 110 are narrower at the inner circumference of the ring 108 than they are at the outer circumference thereof and the former dimension, which determines the width of the vertical spaces between the impact faces of the target members when the assembly is completed, is proportioned or dimensioned in relation to the stock to be milled so that, in general, the width of the space between the target faces of the targets is no greater than the minor dimension of the product or stock.

With the spacer rings 108 positioned in their respective upper and lower seats 106—107 and 104—105, with the slots 110 thereof facing toward each other and respectively juxtaposed, the target members 101 are inserted with their respective upper and lower end portions slidably received in juxtaposed upper and lower slots 110 of the rings; such assembly is readily effected and it will be noted that, with the lower casing part 67 in lowermost position, access is readily gained and the target members 101 set into position by a simple radially-inward movement which is limited by the upper and lower cylindrical surface seats 107—105.

Thereafter the completed array of targets 101 is fixed in position and this is preferably accomplished by means of two identical clamping bands 113 of suitably flexible metal of good tensile strength and enveloping the assembled target array at the respective upper and lower peripheral portions thereof substantially as indicated in Figure 7. The clamping bands 113 are of a width about the same as the width of the vertical cylindrical surface seats 107 and 105 (see Figure 7 and Figure 113) and they are provided with suitable tensioning means so as to stress the individual target members 101 radially inwardly against the respective seats 107 and 105. Such tensioning means may comprise a bolt 115 (see Figures 9 and 10) which passes through suitable holes in the radially projecting ears of L-shaped lugs 116 secured near the ends of the relatively heavy clamping band 113, the ends 113$^a$ and 113$^b$ thereof being cut on a diagonal somewhat as shown in Figure 9 so that any gap between the ends extends at a substantial angle to the outer vertical faces of the target members 101, thus insuring that no target member escapes being clamped in position as might be the case were the gap between the ends aligned with the outer face of the target members. Because, as above noted, the spacer rings 108 are of radial dimension less than the longer cross-sectional dimension of the targets 101, as illustrated in Figure 13, the clamping rings 113 dependably clamp the target members 101 against the respective seats 107 and 105 and do so without being interfered with by the spacer rings 108 themselves.

The mill stock, entering the induced air stream as it emerges from the spout 37, valve 38 being suitably set for air intake, is accelerated by the air moving downwardly in the converging conduit section 76 (Figure 7) and enters the round nozzle inlet passageway 55, emerging from the peripheral nozzle outlet 96 at relatively high velocity, a velocity sufficient to impact and comminute the mill stock as it is discharged radially outward against principally the upper portions of the faces of the targets 101 which surround the nozzle outlet and are positioned in the peripherally continuous path of flow; the product entities or components are fractured or broken up by the impact against the targets and thus appropriately comminuted, most if not all of the product particle passing through the narrow vertical spaces between adjacent target faces, it being noted that these spaces are divergent (see Figure 8) in radial outward direction and thus prevent lodgement of particles therein and clogging of these spaces. Thus also is facilitated the follow-up passage of air radially outward through these diverging spaces, air and particles emerging into the annular space between the target array and the cylindrical wall portion 67$^a$ of the lower casing part 67, that annular space being of substantail volume and thereby facilitating substantial expansion of the air with accompanying substantial diminution in its velocity. Some particles, those that do not pass into the spaces between the targets 101, together with some of the high-velocity air discharged from the nozzle outlet 96, are deflected more or less downwardly along the impact faces of the targets 101 and thus enter the space below the nozzle outlet and below the conoidal member 94, that space being also of relatively large dimension and volume, thus facilitating expansion of the air and substantial reduction in its velocity and therefore also in the velocity of the particles. Both of these spaces, in which substantial reduction in velocity take a place, overlie the large volume of space provided by the frusto-conical or hopper-like casing portion 67ᵇ, and the total volume thus provided to receive the high-velocity air discharged from the nozzle outlet 96 is thus appropriate for substantial air expansion with consequent large reduction in air velocity for exit, with the product particles suspended therein, at low velocity at the bottom of the impactor. Such low velocity exit of the particle-carrying air is by way of the passage provided by the casing portion 67ᶜ and by the casing support sleeve 63 and the bottom floor sleeve 40, followed by movement through the discharge conduit 41 (Figure 1) also at low velocity that is appropriate for efficient and economical conveying and elevating of the milled stock under the exhaust effect of the blower 30 and in coaction with means for maintaining the product particles in suspension in the low velocity air in the horizontal conduit section, that is, in the illustrative embodiment the horizontal manifold 43 of Figure 1, and also in the bends or turns such as the turn 45 of Figure 1.

This low velocity for conveying and elevating the stock may be, as a minimum, on the order of 30 feet per second in contrast to the high impacting velocity provided in the impactors 35 which may be on the order of 125 feet per second, as for effecting a "first break" as of wheat, and which can be of much higher velocity on the order of 300 feet per second, as for producing a highly comminuted product at a later step of successive impacting or milling procedures; these values of relative velocities are not set forth by way of limitation and are given principally for the purpose of giving some practical measure of relative values of impacting velocity and conveying velocity, for the former, as above noted, has to be varied or suited to various factors or requirements of the mill stock and the latter, also affected by such factors, is or has to be varied according to one or more of such factors as well as according to such physical factors as size, capacity, or dimensions of the particular system or installation and other such practical considerations.

As above described in connection with Figure 1, more than one impactor 35 may be incorporated into the system, illustratively the four impactors shown in Figure 1. The discharge conduits 41 that lead from the impactors to the horizontal manifold portion 43 are preferably rigidly connected to each, in any suitable manner and in each exit conduit 41 I interpose a vibration-damping coupling generally indicated, in Figure 1 at 118, preferably with its plane at a substantial angle to the axis of manifold 43. These couplings 118 may be of any suitable form, embodying a suitable yieldable or other non-metallic damping medium, and in Figures 4 and 5 one such possible damping coupling element is shown in cross-section to illustrate a preferred embodiment thereof.

As shown in Figure 1, each impactor discharge conduit comprises two sections, an upper section 41$^a$ and a lower section 41$^b$, terminating in adjacent parallel coupling or connector flanges 119 and 120 between which to receive the vibration-damping coupling 118. By putting an obtuse-angled bend in upper section 41$^a$, as indicated in Figure 1, I am enabled to provide a suitable angularity of the vibration-damping coupling 118 relative to the axis of the manifold 43. The damping coupling 118 comprises two ring-shaped plates 121 and 122 (Figure 5) between which is interposed an annulus 123 of substantial cross-section and made of rubber or other suitable elastomer with its annular end faces suitably bonded, in concentric relation, to the ring plates 121—122.

Preferably, the elastomer annulus 123 is of greater axial dimension at its inner diameter (which matches that of the discharge conduit 41) than at its outer diameter, as by molding it with upper and lower frusto-conical bonding surfaces; the contiguous faces of the ring plates 121, 122 are of respectively matching configuration, as shown. Screws 124 secure the ring plates of the damper coupling and the respective flanges of the conduit sections 41$^a$ and 41$^b$ together. With such construction, it is possible to substantially equalize the total pressures exerted on the inside exposed area and on the outside exposed area of the elastomer member 123, the former surface area being subjected to less than atmospheric pressure per unit area and the latter to atmospheric pressure.

The directional obtuse angle or or small bend provided in each discharge conduit 41 (Figure 1) is helpful in giving the low-velocity air carrying the product particles suspended therein an impetus or component of motion in the direction of intended flow in the horizontal manifold portion 43 of the system, that is, toward the left as viewed in Figures 1 and 2. In the illustration, four pneumatic impactors 35 discharge through conduits 41 into it and, assuming that all four impactors are operating, the above-mentioned increase in the cross-section of manifold 43, provided as by tapering it from its right-hand or dead-end to its exit end 43$^a$ (Figure 2), aids in maintaining substantially uniform air velocity so that detrimental velocity changes that tend to cause product particles to drift or fall to the bottom wall of the conduit 43 are lessened. Nevertheless, the directional changes caused by entry from the conduits 41 into the horizontal conduit 43 of the low-velocity air with suspended product particles and other factors, particularly such as the overall length or reach of the horizontal manifold 43, tend to increase the density of suspension of product particles in a downward direction of the cross-section of the manifold conduit portion 43 and, aided by the effect of gravity on the particles themselves, tend to cause drag or sliding friction and ultimate deposition of product particles on the inside of the bottom wall. Similar effects, aggravated by necessary changes in direction of movement, take place in making the transition from substantially horizontal movement in manifold 43 to vertical or elevating movement in the vertical conduit 34; for this reason, and thereby to gain some alleviation of these effects, the turn 45 (Figure 1) of substantially 90 degrees, is subdivided into several turns, such as two successive turns each effecting a directional change of movement of about 45°. The turn 45 may be and preferably is constructed as a single individual unit, of circular cross-section, provided with suitable couplings or connections at its respective ends; like the manifold 43, it is made of sheet metal of suitable thickness, on the order of ⅛ inch. At its right end, it is connected, in any suitable manner, and the connection can be a rigid one, to the left end 43$^a$ of the horizontal manifold conduit portion 43, the circular cross-sections, as appears in Figures 1 and 2, where they join being the same.

At its left or upper end, the turn 45 is connected to the elevator conduit 34 through a vibration-damping coupling 135 which is preferably of a construction similar to the vibration-damping couplings 118 above described, excepting that, as is indicated in Figures 4 and 5, its plane is at a substantial angle to the longitudinal axis of manifold 43 and therefore its connecting ring-like plate members 136—137 and the interposed and thereto bonded rubber or elastomer member 138 and oval in configuration as are their internal apertures or openings; because of the above angularity, the connecting flanges 139 and 142 of turn 45 and of elevator conduit 34 have the same angular relationship and are oval in shape.

Elevator conduit 34 may be mounted or held or secured by any suitable means as, for example, suitable fastenings diagrammatically indicated at 140 where the conduit passes through the floors F², F³, etc.; at its upper end, as at 141, it connects to the intake of the cyclone separator 20 through a turn 143 (see also Figure 3).

Turn 143 merges from circular cross-section at its intake end to rectangular cross-section at its outlet end where it joins the separator intake. Also, turn 143 may be provided internally with suitable or conventional turning vanes 144 as indicated in Figure 3.

With the vibration-damping coupling connector 135 at its lower end, vertical conduit 34 and other apparatus, such as the cyclone separator 20, connected thereto, as well as portions of the building structure to which the conduit is fastened or mounted, are mechanically insulated against the transmission thereto of vibrations to which, as is about to be described, the turn 45 and the horizontal manifold 43 are subjected, the damping conduit-couplings 118 (Figure 1) associated, as above described, with the vertical impactor-discharge conduits 41, serving to insulate the floor F² and the pneumatic impactors 35, in similar manner. Like the turn 45, the tapered horizontal manifold 43 is preferably made of suitably heavy sheet metal, on the order of ⅛ inch thickness; both are preferably made of light metal, such as aluminum alloy. Conduits, if made of aluminum, are preferably anodized, for better wear resistance.

The tapered manifold, which, with the turn 45, is set into coacting vibration as is about to be described, is preferably supported and aligned so that its axis, that is, the axis of truncated cone which it defines because of its tapered shape, is inclined upwardly toward the left as viewed in Figure 1, preferably at an angle such that its wall portion that forms its bottom is substantially horizontal. This preferred relationship is also seen in the end view of Figure 6. Thereby also the total angle of the turn 45 can be made somewhat less than 90°, facilitating transition of the low-velocity particle-laden air into the elevator conduit 34.

The progressively increasing cross-section of horizontal manifold portion 43, in relation to the impactor-discharge conduits 41, which connect to it at progressively spaced points is kept larger, also progressively, than the sum of the cross-sections of the latter, in the direction from right to left in Figures 1 and 2, by an amount on the order of 25 percent. For example, at its right or dead-end, where the end-most impactor-discharge conduit 41 discharges into it, its cross-section is about 25% greater than that of that discharge conduit; at its left or exit-end 43ᵃ, where it joins the turn 45, its cross-section is about 25% greater than the sum total of the cross-section of all of the impactor-discharge conduits 41.

Suitable means are provided for reciprocally vibrating horizontal manifold portion 43 and the turn portion 45, of the system, in controlled and directionally coacting relation to other parts and their functions, of the system. An illustrative and preferred embodiment is about to be described. Thus, referring to Figures 1, 2 and 6, I provide a rigid stationary support structure relative to which the above portions are reciprocally and vibrationally supported; this structure comprises a long channel-cross-sectional member 150, overlying the manifold 43 and of greater width than the maximum transversal dimension of the latter and with its flanges 151, 152 downward. It is rigidly supported in horizontal position (Figure 1) from the floor F² immediately above, by any suitable rigid structure, preferably appropriately cross-braced (not shown), and for simplifying the drawings and description I have shown for this purpose rigid inflexible supports 153 in the form of suitably heavy pipe or tubing having securing flanges 154 at their upper ends for anchorage to the ceiling or floor F² and similar flanges 155 at their lower ends for securing thereto the channel support 150. So as not to encumber the views in the drawings these structural supports 153 are shown as only four in number (see Figure 2) at the respective four corners of the channel support 150.

As is better shown in Figures 1 and 2, the flat horizontal web of channel 150, which terminates at its right end considerably short of the first (from the right) discharge conduit 41, is apertured, as at 156, to provide ample clearance for the passage therethrough of the lower sections 41ᵇ of the remaining discharge conduits 41, and, with the manifold 43 supported as later described from the channel support 150, each lower conduit section 41ᵇ, with its coupling flange 120, at its upper end and at the desired angle, forms part of a unitary assemblage, facilitating installation of the latter and also the connecting of the conduit sections 41ᵇ, through the damping couplings 118, to the stationary depending upper conduit sections 41ᵃ.

Spaced downwardly from and parallel to the channel support 150 are two parallel angle frame members 157, 158 whose vertical flanges 159 and 160 fall respectively in the vertical planes of depending flanges 151 and 152 of the channel support 150 and in which relationships of parallelism they are held by longitudinally spaced pairs of depending parallel links preferably in the form of yieldable cantilever arms 161—162 (see Figures 1, 2 and 6). In the illustrative embodiment, five such pairs of cantilever arm suspensions are shown; their arms are external of the flanges (see Figure 6) to which they are connected preferably as is later described.

To the parallel angle members 157, 158, the horizontal manifold portion 43, with its integral or unitarily assembled or thereto secured bend 45, is rigidly secured, as by welding, use being made of suitable interposed pieces or parts where necessary, particularly to compensate for the lessening cross-section of manifold 43 (toward the right, in Figures 1 and 2) in relation to the desired parallelism of angle members 157 and 158. Thus, at the larger end of manifold 43, short angle sections 165 and 166 (Figures 1, 2 and 6) having longer flanges (Figure 6) may be welded, as at W, at opposed sides of the round manifold, thus providing suitably spaced parallel vertical flanges against which the respective angle member vertical flanges 159 and 160 may rest and to which they are suitably secured, preferably by studs 167 welded to the short angle sections and which pass through holes in the vertical flanges of the parallel angle members 157—158, clamping nuts 168 completing the fastening.

At the smaller diameter end 43ᵇ of the manifold 43 (Figures 1 and 2), short channel sections 171 and 172, as is better shown in Figures 14 and 15, may be welded as at X, at the edges of their horizontal parallel flanges, to the manifold, one at each side of the latter, to provide and position their respective vertical webs in parallelism and at the desired horizontal spacing. To these webs are rigidly secured the vertical flanges 159, 160 of the angle frame members 157 and 158; preferably the latter have suitable holes through which extend studs 173 secured to the short channel sections 171, 172, nuts 174 threaded onto the studs 173 clamping the parts together.

In this manner, parallel angle frame members 157, 158 with tapered manifold portion 43 form a strong, rigid sub-unit, connectable to the upper channel support 150 by the several pairs of parallel link-like cantilever arms 161—162 which have limited yieldable pivot-like connections, at their upper and lower ends, with the vertical depending flanges 151 and 152 (Figure 6) of the upper channel member 150 and the upwardly directed flanges 159 and 160 of the lower angle members 157 and 158 to which the manifold 43 is secured as above described.

Since these pivot-like connections and the arms 161—162 of the several pairs are similar, it will suffice to describe one of them. At their respective ends, each arm, such as arm 162 shown in side elevation on a larger scale in Figure 16, coacts with parallel pivot studs 176 secured respectively to the depending flanges of the upper channel members 150 and to the upstanding flanges of the lower parallel angle members 157—158; these studs 176 may be constructed and secured in position as is shown in Figure 17, where one of them is shown in section secured to depending flange 172 of channel member 150. Thus, the left end of stud 176 fits into a hole in the flange and is provided with a shoulder 176ᵃ by which, as at Y, it is welded thereto. Stud 176 has a keyway 176ᵇ and at its outer end is threaded to receive a nut 177 and washer.

At each end, arm 162 has a relatively large eye or bore 162ᵃ that provides an internal cylindrical surface that is radially spaced from the external cylindrical surface of a coaxial sleeve 178 that has a bore so that it is snugly receivable on stud 176 and it also has a keyway 178ᵇ to mate with stud keyway 176ᵇ for the reception of a key 180. In the annular space between the two cylindrical surfaces is a sleeve or layer 181 of rubber, or like suitable elastomer, under pressure, being interposed therebetween, in known manner, to effect mechanical adhesion to the two cylindrical surfaces. Such adhesion results from pressure produced as a result of the manner of assembly of the rubber sleeve to its externally and internally associated mated parts, before assembly, the rubber element being shorter and of lesser internal diameter and greater external diameter than the annular space it is to occupy after assembly, with the result that after assembly it remains in the latter under pressure caused by the forced enlargement of its internal diameter and shortening of its external diameter.

In the assembly of pairs of such link-like members 161—162 as indicated in Figures 1, 2 and 6 and as earlier above described, the keyways thereof and of the studs 176 and hence also the keys 180 at their respective upper and lower ends are set so that each pair of arms 161—162, while all are parallel (see Figure 1), preferably makes an angle, somewhat as in Figure 1, to the transverse vertical plane through its horizontally aligned upper pair of studs 176 that are rigidly fixed to the stationary upper channel member 150; the rubber elements 181 at both ends of each arm 161—162 can yield or strain in torsion, they absorb vibration, and yield to possible misalignment of the studs 176 at either end of each arm.

Means are provided for vibrating or oscillating the thus-supported manifold portion 43 and turn portion 45, with coactions later described. Preferably I employ an electrically actuated vibrator or reciprocator generally indicated by the reference character 183 (Figures 1 and 2) and, in the illustrative and preferred form, driven by an electric motor 184, preferably of the gear-head type and provided with any suitable means for controlling or setting its speed of drive. Motor 184 is mounted upon and adjacent to right-hand end of stationary channel member 150 with its driving shaft end and pulley 185 overhanging or projecting beyond one side edge thereof (Figure 2) so that the driving belt 186 can extend downward and toward the right (Figures 1 and 2) to the laterally overhanging pulley 187 of the driving shaft of reciprocator unit 183 that is mounted upon and secured to the frame of angle members 157—158 that support the manifold 43.

Driven reciprocator or vibrator unit 183 has a base plate 188 by which it is secured, as by bolts or screws (not shown), to a slanted saddle plate 190 which is better shown in Figures 1, 2, 14 and 15. As better shown in Figure 14, it has a cut-out 190ᵃ from its bottom edge of a size to take over the smaller diametered portion 43ᵇ (Figure 1) of the manifold 43, and thus providing two spaced portions 190ᵇ and 190ᶜ (Figure 14) that extend to either side of the manifold and abut against the aligned ends of the short, laterally spaced channel sections 171—172 by which the smaller end of manifold 43 and side angle members 157—158 are secured together; the ends of channel sections 171—172 are preferably slanted so that saddle plate 190, when welded thereto as at Z, projects upwardly at an angle (see Figure 1) so that it is substantially parallel with the pairs of parallel cantilever arms 161—162.

Oscillator or reciprocator device 183 is of known construction, as in Shaler U. S. Patent No. 1,999,213 of April 30, 1935, and need not be described in detail. It comprises a suitable casing having therein two rotating weights (not shown) which, from the shaft of pulley 187, are driven at the same speed but in opposite directions of rotation; at two points in each complete revolution, these being the points, 180° apart, at which the weights pass each other, the effects of the centrifugal forces are synchronized and at all other points in the respective rotational movements of the two weights the effects of centrifugal forces neutralize one another. It is therefore in the direction or line of the diameter on which those two points fall that the unit produces a straight-line reciprocating action or motion which, in Figure 1, is communicated, through the saddle plate 190, to side angle frames 157—158 that support the manifold 43 and turn 45, being in a direction at right angles to the saddle plate 190 and hence generally at right angles to the sets of parallel arms 161—162 to which the saddle plate is generally parallel as above noted.

The reciprocating forces produced by the device 183 are, through the saddle plate 190, directly applied to the manifold-supporting angle frames 157—158 and hence are effective to reciprocate the latter, with manifold 43 and turn 45, in strokes of small amplitude and in a generally horizontal direction as viewed in Figure 1. However, because of the normal or at-rest angularity of the pairs of parallel cantilever arms 161—162 as above described and shown in Figure 1, these arms cause the pivot studs 176 at their lower ends and hence the frame 157—158 and manifold 43 with the turn 45 to oscillate along a short arc such that, on the leftward stroke (the direction in which the low-velocity particle-laden air is to move in the manifold) there is a substantial upward component of motion as well as a substantial horizontal component, the pairs of parallel arms 161—162 insuring that the manifold is maintained substantially parallel to itself during this oscillation. The reciprocator device 183 is driven at a suitable speed, illustratively 60 R. P. M., thus oscillating the manifold 43 and turn 45 at a rate of 60 complete cycles per minute.

During such vibrating action of the manifold 43 and turn 45, as a unit in the illustrative embodiment, the vibrating-damping couplers 118 in the impactor-discharge conduits 41 (Figure 1) and the damping coupler 135 at the upper end of turn 45 yield at their respective rubber elements, such action being facilitated and made substantially uniform in that these damping couplers are at the same angular relationship, their transverse planes being in general parallel to the tangent at the mid-point of arc of oscillation as appears from the at-rest position of the parts shown in Figure 1 and in which position the rubber elements stand substantially undistorted and coaxial with their respective connecting flanges. Accordingly, upon oscillation of the frame 157—158, each rubber element yields or distorts substantially uniformly and more or less similar to each side of the mid-point of the arc of oscillation.

During vibration of the manifold and turn, the pairs of arms 161—162 swing through a small angle, with the studs 176 at their upper ends as their respective axes; the rubber element 181 (Figures 16 and 17) at each end of each arm 161—162 yield, reversibly, in torsion during each cycle of oscillation, and they effect good vibration absorption or insulation against transmission of detrimental vibration to the upper stationary channel support 150 as well as to the supporting structure of the latter, such as members 153.

As earlier above mentioned, I provide suitable means for controlling and varying ingress of free air to the manifold portion 43 of the system substantially according to the number of pneumatic impactors 35 that are cut out of the system. This means may conveniently take the form of a suitable hand-controlled valve 182 (Figure 1) preferably located on floor F² adjacent to the bottom of impactors 35 and having an air inlet 182ª and an air outlet 182ᵇ; the latter is connected by a conduit 175 for discharge of air, at a rate controllable by valve 182, into the manifold 43, preferably at or near its dead end 43ᵇ.

By connecting the discharge end of air-compensating conduit 175 to discharge into the end-most impactor-discharge conduit 41, just above the vibration-damping coupling 118, that is, by connecting it to the lower end of the upper section 41ª instead of to the lower section 41ᵇ thereof, the damping coupling 118 between the latter serves also to substantially insulate compensating conduit 175 for the vibrations or oscillations of the manifold 43 and its associated parts.

Suitable means are provided for permitting coordination of air-compensating valve 182 with the settings of the intake valves 38 of the several pneumatic impactors 35 (Figure 1) and with the number of impactors 35 that are effective at any given time. One or more of the latter may be cut off or shut down for various reasons, such as to provide flexibility of over-all operation or capacity of the system or for cleaning purposes or for rearrangement or replacement of targets 101 or for preparation for a subsequent run of the same or a different mill product or mill stock. For cutting out any one or more of the impactors 35, I provide in each a cut-off valve structurally indicated as whole by the reference character 179 in Figure 7.

Valve structure 179 may comprise a solid conical valve member 191 mounted in any suitable way coaxially for movement into and out of seating relation to the outlet passage, circular in cross-section, provided by the casing portion 67ᶜ of the lower casing part 67. Conical valve member 191 may be, and preferably is, of solid yieldable material such as rubber or other elastomer or it may comprise a central metallic part covered with a suitable thickness of rubber or like yieldable elastomer material and it is provided with means, such as the flexible cord or wire member 192, by which it may be supported coaxially with the seat of the discharge opening and for movement into and out of closing position relative thereto. Thus, for example, the flexible cord member 192 may pass over a guide 193 mounted in a bracket 194 that is secured to a flanged sleeve member 195 that passes through the wall of hopper-like casing part 67ᵇ and is secured thereto as by welding (not shown); flexible wire member 192 is secured to a slidable plunger 197 slidably received in sleeve 195 and provided at its outermost end with a handle or hand-knob 198 by which the plunger 197 may be shifted and conical valve part 191 moved into or out of seating position relative to the discharge opening provided by the lower end of hopper-like casing portion 67ᵇ where it merges into the mounting and securing sleeve extension 67ᶜ thereof.

In the wall of sleeve 195 is threaded a thumb-screw 200 adapted at its inner end to engage the plunger 197 and lock it in selected position, whereby valve member 191 may be held in uppermost or wide-open position or in lower-most closing or seating position or in any intermediate position of valve-opening.

Accordingly, when any one or more of the pneumatic impactors are to be cut out of the operation of milling and elevating that is being performed, as for readjustment of the nozzle formed by surface 93 and conoidal surface 95, or for cleaning, or for rearrangement or replacement of target members 101, valve 36 (Figure 1) is closed to cut off flow of product to be milled or treated in the particular pneumatic impactor 35 and then valve 191 (Figure 7) is closed by releasing locking thumb-screw 200 to allow valve member 191 to seat itself and close off exit of air from that particular impactor and thus cut the latter off from the horizontal conduit 43 above described. Atmospheric pressure holds valve 191 in good seating and sealing relation to its seat. Thereupon handwheel 57 may be operated to lower the lower casing part 67 from its sealed connection at gasket 68 with the upper casing part 47 to gain access to the array of targets 101 and to the mounting of the conoidal member 94.

As any one of pneumatic impactors is thus cut out or cut into the system, compensating valve 182 (Figure 1) is appropriately set or is reset to increase its valve opening as more impactors are cut out, and is reset to decrease its valve opening as impactors are cut into the system, thus to maintain substantially constant the volume of air, and hence its low velocity, in the horizontal manifold 43, turn 45 and vertical or elevator conduit 34 and thereby sustain low-pressure or low-velocity conveying and elevating of the milled product to the separator 20 or to such other apparatus as may be desired or suitable for the particular milling or other mill operation or step at hand.

Throughout such variable product conveying or elevating or both, the horizontal manifold 43 and the turn 45 are maintained in vibration, as above described. With respect to the horizontal manifold 43, by reason of its vibration or oscillation, it is made to coact with the conveying low-velocity air stream and with the intake conduits 41 to oppose deposition of product particles upon the bottom inside face of the conduit 43, not only in those portions thereof against which the discharge conduits 41 tend to impinge the particles suspended in their respective generally downwardly moving, discharging low-velocity air stream but also at intervening or subsequent portions of the bottom face of conduit 43. In general effect, the mechanical vibrations, particularly because of the vertical motion or vertical component of motion transmitted to it in rapid strokes or cycles, cause the inside surfaces of the conduit to mechanically repel product particles and, particularly at the bottom wall or surface of the conduit 43, to bounce upwardly and back into the moving air stream those product particles that impinge against it or that drift, as by gravitational effects, onto it and thereby tend to deposit themselves thereon; in thus being projected back into the low-velocity air moving along the conduit, the product particles are in effect maintained in suspension in the moving air and their transport by the latter facilitated without drag or sliding friction along the conduit wall, thus also materially lessening wear of the conduit. These sections are, furthermore, aided or accentuated in that the vibrator mechanism is coactingly directional in its actions, having a substantial horizontal motion of horizontal component of motion (to the left) which is effectual, with the aid of the vertical component, to give a propelling effect, in the direction of flow of the low-velocity air, upon the product particles; in the illustration, these coacting effects follow from oscillation along the arc earlier above described. Accordingly, product particles that engage the bottom wall are projected not only upwardly therefrom but also forwardly, that is, in the direction of flow of air, being thus virtually accelerated directionally into the moving air and more or less relieving the latter of the decelerating effect were the moving air to have to pick up, as it were, a product particle from a position of rest.

In the turn 45, where the tendency to deposit product particles is quite substantial because of the directional changes involved, generally similar coacting directional effects take place. Product particles that impinge against the outer walls (the left-hand walls as seen in Figures 1 and 2) of the turn 45 or tend to deposit thereon or to drag therealong are virtually prevented from depositing thereon and impelled away from these wall surfaces, being substantially accelerated into the low-velocity moving air in the general upward direction of that movement by the coacting effects of the directional components of the vibrating motion, aided by the upward incline of the wall surfaces in turning the air movement upwardly. In this manner, maintenance of good diffusion of product particles throughout the low-velocity air as it proceeds through the directional changes effected by the turn 45 and avoidance of piling up mill stock or milled product particles can be effected with lessened disturbance in substantial continuity of air flow.

Accordingly, the flow that enters the bottom end of vertical or elevator conduit 34 is relatively steady and uniform, comprising low-velocity air with the product or product particles well suspended therein, and continued substantially uniform movement thereof upwardly in the elevator conduit 34 is thus facilitated. Furthermore, these actions in maintaining suspension of the product in the low-velocity air aid in maintaining, in each pneumatic impactor 35, substantially steady high-velocity air movements for impact milling in each as set by the respective intake valves 38 and internal conoidal nozzle structure 95—93 of the impactors 35; thus detrimental departure from the selected high impacting velocity, within the respective impactors 35, does not take place.

As above noted, provision is made for intake of compensating air into the control or setting of the gate 176 of the smaller end of manifold 43, preferably in a manner to be controllable from the same floor on which the several pneumatic impactors 35 are located; in the illustration this is achieved, together with other advantages, by locating compensating air valve 182 and its hand control on floor $F^2$ as above described and shown in Figure 1. In such illustrative manner, correlation of the various controls, as from a single location such as the floor $F^2$ where the several pneumatic impactors 35, 35, etc. are located, may be facilitated to achieve and substantially maintain for any of the variable conditions or requirements of operation and some of which are illustratively set forth above, the desired relationship between the relatively high-velocity air movements, for impact milling, in the pneumatic impactors 35 and the relatively low-velocity air movement for efficient conveying and elevating, and thereby maintain the various interdependent coactions above described. It will be seen that the apparatus and system are well adapted to facilitate meeting a substantial variety of practical operating requirements or conditions, not only as to the characteristics or properties of the particular mill stock that is being operated upon but also with respect to flexibility of operation and control to meet various requirements or exigencies of practical operation while maintaining continuity of functioning throughout.

For example, less than all of the pneumatic impactors 35, 35, etc. that constitute the battery of impactors on floor $F^2$ may be operated for any given or needed run of mill product; in such case, as already made clear above, any one or more of the pneumatic impactors may be cut out of the system by shutting off the product supply thereto at valve 36 (Figure 1) and then by closing valve member 191 (Figure 7), whereupon the valve 182 is reset accordingly to maintain substantial continuity of volume and of low-velocity flow of air at less than atmospheric pressure in the horizontal conduit 43 and the turn 45 and the elevator conduit 34, thereby also avoiding upsetting or detrimentally affecting the high-velocity impacting air flow in the impactors that are retained in operation.

As also above indicated, any one of the battery of impactors 35, 35, etc. may be cut out, in the manner above described, for other purposes, as to gain access to the interior thereof. In the latter case the handwheel 57, after shutting valves 36 and 191, as above described, is now turned to lower the lower casing part downwardly from the upper casing part 47, the coaxial relationship therebetween being maintained by the sliding fit of the support-sleeve 63 within the floor sleeve 40, the sliding fit maintaining a pneumatic seal throughout the relative movement of the parts and valve 191, remaining seated under atmospheric pressure, moving downwardly along with its valve seat. The lower casing part 67 can, in this way, be lowered sufficiently to provide roomy access, from all sides of the impactor structure, to the internal parts thereof.

Thus, when it is desired to change the setting of the high-velocity nozzle formed by the curved surfaces 93 and 95 (Figure 7), the vertical setting of conoidal member 94 may be changed by raising or lowering it relative to the upper curved surface 93 by turning either the nut 98 or the stud shaft 97, as earlier above described. Also, the conoidal member 94 may be readily renewed, or replaced by one of appropriately different conoidal upper surface 93; this may be done by disengaging nut 98, that rests on the spider frame hub 91, from the threaded portion $97^c$ of the shaft whereupon the shaft and conoidal member as a unit are let downwardly so that the conoidal member 94 rests upon the horizontal arms 92 of the spider frame with the shaft 97 projecting downwardly through the hub 91. By applying a wrench at the opposed flats 100 of shaft 97, the latter may be turned relative to the conoidal member and the two parts thus separated. The conoidal member is then removed from the structure by passing it downwardly between any two of the spider arms 92 and the replacement conoidal member is then inserted through the spider frame and brought to rest flatwise on the horizontal frame arms 92, whence the shaft 97 is passed upwardly through the hub 91 and nut 98 and its upper end threaded into the hub of the conoidal member, thus assembling the two. Thereupon the assemblage is raised to engage the threaded part $97^b$ of the shaft with the nut 98 and by the resultant threaded connection the conoidal member is brought to rest at the desired vertical spacing from the companion and coaxial nozzle-forming surface 93 of the upper casing portion $47^a$.

With the lower casing part 67 in lowered position, there is provided ready access to the target members 101 and their coacting mounting or assembly means, as for replacing them or, when worn, to rearrange them to present other and unused impact surface portions thereof. In the latter connection, it was pointed out above that the length of the target members 101 (Figure 7) and the relationship thereof with the peripheral nozzle outlet 96 are such that it is only the upper portion of the narrow front faces of targets 101, say, somewhat less than the upper half of their length, that is in the effective path of high-velocity discharge of air and mill products from the nozzle, and accordingly it is only these upper surface portions and their edges that are subjected to wear. When so worn to detrimental extent, the clamping bands 113 are loosened up and preferably removed, simply letting them down to come to rest on the horizontal spider arms 92; the target members 101 may then be individually removed by simple radial outward movement, turned end-for-end so that what was the upper worn surface and edge portion is now lowermost and the remaining unworn surface portion is uppermost, and then reinserted by radial inward movement with their upper and lower ends entering opposed slots 110 of the upper and lower spacer rings 108, and, when each one has been so turned and reinserted, the clamping bands 113 are restored, the lower casing part 67 raised into sealing relation with the upper casing part 47, and the impactor is again ready for operation with new or unworn impact surfaces and edges of the targets 101 presented to the nozzle discharge. Upon detrimental wear of these portions, the just described procedure is repeated excepting that, instead of turning the targets 101 end-for-end for reinsertion, they are individually turned 180° about their vertical axis to present, to the nozzle discharge, the upper portion of what theretofore was the outermost vertical rear face of the target. When that surface portion is detrimentally worn, the described steps are repeated but now each target is turned end-for-end, as is now clear. Thus each target member 101 has at least four target faces which can thus be brought successively into coacting relation with the nozzle discharge, as wear proceeds, and in that manner the life of any given target array is vastly increased and replacement needs reduced to one-fourth. It will be noted that the extreme end portions of the individual targets 101 are well protected against wear inasmuch as they are not only out of range of the nozzle discharge but also are well housed or mechanically protected, their respective surface portions being virtually encased in the seats and slots and by the clamp rings, and accordingly their initial geometry is retained unimpaired and thus accurate reseating, when they are individually turned as above described, is assured and the desired spacing between adjacent targets, especially at the inner narrow ends of those spaces, may be consistently maintained. The desired radially outward divergence or widening of the spaces between adjacent targets can thus also be reliably maintained; as above noted, their divergence prevents lodgment of mill stock or particles therein and consequent clogging thereof and thus their coaction with the nozzle-emitted air can continue substantially consistently, these slot-like passages or spaces between the targets, in passing air therethrough, materially lessening air eddies or detrimental turbulence as the air moves generally radially outward from the peripherally continuous nozzle outlet 96 to impel the mill stock or product at high velocity against the circular array of targets 101.

And, in view of the foregoing, it will now also be clear that the mounting of the array of targets 101, coupled with facility and quickness of access thereto, permits also ready rearrangement of the targets 101 to provide for change of width of impact surfaces of the targets or change of the spacing between adjacent targets or both, according to the character of the mill stock being operated upon, the particular stage or "break" of milling and the like. Thus, for example, for the same width of target impacting surface but for a different width of divergent space or slot between adjacent targets, the slotted spacer rings in which the upper and lower ends of the targets are received, as above described, only need to be replaced by similar rings of the same slot width but with larger or smaller width of intervening upstanding parts 111 (see Figure 11.) To provide a different width of target impacting surface, the target members 101 are simply changed correspondingly as to their smaller cross-sectional dimension (see Figure 8) and provide them with spacer rings of correspondingly dimensioned slots 110 with the intervening upstanding parts appropriately dimensioned according to the desired width of space between adjacent target members.

Restoration to service of the impactor, after making such changes as those illustratively above set forth, is quickly effected, first by simply turning the hand-wheel 57 to raise the lower casing part 67 to bring its upper peripheral edge into sealing relation, at the gasket 70 (Figure 7), with appropriate tightness, the lower casing part 67 and its solid support in the floor sleeve 40 coacting with the vertical standards 52 to provide reliable support for the entire apparatus; the ensuing operation of various valves and control to bring the restored impactor into interdependent coactions with the other parts of the system will now be understood and clear, in view of the foregoing description in connection therewith.

As above described, the high-velocity air emitted from the peripherally continuous nozzle outlet 96, after causing high-velocity impact of the mill stock against the targets 101, passes downwardly on both sides of the target array and expands into the large volume of space provided by the casing portions 67$^a$ and 67$^b$ so that its velocity is materially reduced; at the same time and because of its substantial expansion, it undergoes some reduction in its temperature and, in carrying along with it the stock particles resulting from impacting of the mill stock against the targets with accompanying heating of the stock particles, the lower-temperature air exerts a cooling effect upon the stock particles which are more or less uniformly suspended in the air as it moves, at low velocity, downwardly for discharge at the lower end of the impactor. In this manner, undesirable or detrimental heat effects upon the stock particles, particularly with respect to their moisture content, can be avoided. In like manner advantageous cooling of the targets 101 can be maintained.

Preferably, the entire system is grounded as a safeguard against accumulation of charges of static electricity that might be caused by the movement of air and suspended product particles relative to conduits, manifold and other parts of the system. In Figure 1 such grounding is indicated. Thus, a circuit conductor 201 leads from a suitable "ground" G and is electrically connected, as at the points indicated, to the upper sections 41$^a$ of the impactor-discharge conduits 41, the braces or supporting brackets 153 and the elevator conduit 34; since the rubber or like elements of the vibration-damping conduit couplings 118 and 135 act as electrical as well as mechanical insulators between the stationary parts and the vibrating parts of the system, suitable flexible jumper conductors may be employed to electrical bridge over these connected across the coupling flanges of damping coupling 135.

The circuit arrangement for supplying electrical energy to the several motors may take any suitable form. Preferably such arrangement includes any suitable provision whereby the vibrating or oscillating or reciprocating means for the horizontal manifold 43 and turn 45 may be set into action before the system is otherwise, as by suction blower 30, brought into operation; the low-velocity, low-pressure movement of particle laden air, induced by blower 30, should not be depended upon for conveying the milled stock free from detrimental deposition or piling up of particles on the walls of manifold 43 and turn 45 and accordingly the vibrator device and its driving motor are first energized to insure coaction of the parts, as earlier described, for effective conveyance under the interdependent actions of the several parts. Thus, a suitable switch for vibrator unit motor 184 and a switch for blower motor 31 may be provided; these may be manually operated switches, and thus the circuit of motor 184 can be closed ahead of closure of the blower motor circuit.

Another form of manifold 202 for pneumatic conveying of product from impactors 35 to vertical conduit 34 is shown in Figs. 18 through 24. As there shown, manifold 202 is preferably round in cross-section and it includes a plurality of separate sections 203, 204, 205 and 206, each of which is connected with an outlet sleeve 40 of an impactor 35 at floor F$^2$ (Figs. 1 and 18) by means of vertical conduits 207, 208, 209 and 210, respectively. The connecting conduits 207, 208, 209 and 210 are preferably uniform in cross-section throughout their length so that low-velocity air from impactors 35 will be conveyed into manifold 202 without any abrupt change in velocity of the air stream and for the same reason the cross-section area of manifold 202 increases from right to left (Fig. 18) so that each successive manifold section will accommodate and blend low-velocity air from the conduits without any abrupt change in air velocity. As shown in Fig. 18, manifold section 206 serves as a continuation of vertical conduit 210 and the cross-section area of manifold section 206 is about the same as the cross-section area of conduit 210. The cross-section area of manifold section 205 which accommodates and blends the low-velocity air of conduits 209 and 210 is preferably made about 25% larger than the sum of the cross-section area of conduits 209 and 210 and the cross-section area of manifold section 203 is preferably made about 25% larger than the sum of the cross-section areas of conduits 207, 208, 209 and 210.

In the form of the invention shown in Fig. 1, means are provided for giving manifold 43 a vibrating motion so that any particles of milled product that settle out of the low-velocity air stream in the bottom of the manifold will be resuspended in the stream of air. The same effect is achieved in manifold 202 by giving the manifold rotating motion. As a result of the rotating motion any particles that settle out in the bottom of manifold 202 will be carried up the side of the wall until the particles again drop back into the stream of low-velocity air. Manifold 202 is rotated by means of a suitable motor 211 and in the preferred form of structure shown each successive section 203, 204, 205 and 206 is separately driven by means of a chain and sprocket type drive 212 which receives power from a shaft 213 rotatively mounted in hangers 214. Shaft 213 is in turn driven by motor 211 through a conventional chain and sprocket drive 215 (Fig. 19). Manifold 202 is of course rotated fast enough to carry the mill stock part way up the side of the wall of the manifold and at the same time slowly enough to prevent the mill stock from exerting sufficient centrifugal force to adhere to wall. Since each section of manifold 202 is individually driven, its speed may be adjusted to meet the requirements of the particular operation at hand and the speed of each section may be adjusted according to the diameter of the section which tends to keep centrifugal force exerted by the product substantially uniform to give uniform conditions of flow throughout the length of manifold 202. Rotation of the manifold sections to effect resuspension of mill stock in air is an important feature of the present invention which assists in making possible the use of air moving at a lower velocity than that ordinarily required for horizontal pneumatic conveying of mill stock in stationary conduits.

In order to insure movement of product up the side of the wall of manifold 202, especially at very slow speeds, one or more lifting vanes 216 may be positioned on the interior wall of manifold 202 (Fig. 21). Lifting vanes 216 are preferably uniformly spaced around the wall of the manifold and the lifting vanes 216 may be positioned perpendicular to the wall of the manifold or the lifting vanes 218 may be positioned at an angle with the wall of the manifold to change the angle of repose of particles of product on the lifting surface 219 (leading surface in the direction of rotation) of the vane. A preferred arrangement for the lifting vanes is shown in Fig. 21 where vanes 216 alternate with vanes 218 so that the product on each successive vane will have a different angle of repose. By alternating the vanes in this way, product carried up the side of the wall of the manifold tends to be more uniformly distributed in the low-velocity air stream. It is to be noted that as the diameter of the manifold sections increases, the number of lifting vanes increases and by providing the proper number of lifting vanes in each section resuspension of product in the low-velocity air stream may be kept uniform throughout the length of manifold 202.

Referring now to Figs. 18 and 20, it will be seen that the individual manifold sections include means which rotatively support the manifold on the vertical conduits 207, 208, 209 and 210 and the mounting means are adapted to provide a fluid seal between manifold sections and vertical conduits. While any conventional mounting means may be employed the type illustrated in the drawings is preferred.

The rotative mounting and fluid sealing means 220 for mounting the right end portion (Fig. 20) of manifold section 206 on vertical conduit 210 includes a sealing ring 221 having an annular groove 222 therein which is mounted on the rim of the open mouth of manifold section 206. Sealing ring 221 is keyed to manifold section 206 with a feather key 224 so that it rotates with the section and at the same time the sealing ring is free to slide back and forth in a longitudinal direction along the end portion of manifold section 206. A pin guided spring 226 in annular groove 222 bears against the rim of the open mouth of section 206 and the spring constantly urges sealing ring 221 to bear against a mating ring 228 mounted in a set position on vertical conduit 210. By bearing against each other these two rings form a fluid seal between vertical conduit 210 and manifold section 206. Support for manifold section 206 is provided by means of a circular housing 230 which has one end portion 232 mounted in a set position on manifold section 206 and the second end portion 234 is rotatively mounted on vertical conduit 210 by means of a circular bearing member 236. In the preferred form of structure shown, mating ring 228 forms the inner race of bearing 236. A sealing ring 238 with felt seal 239 carried in end portion 234 of housing 230 bears against the exterior surface of vertical conduit 210 to form a secondary fluid seal for the unit. It is to be noted that circular bearing member 236 and sealing ring 238 are adapted to permit housing 230 to slide back and forth on the end portion of conduit 210 so that the rotary type mounting and fluid sealing means 220 also serves as a flexible coupling to accommodate expansion and contraction of manifold section 206 and vertical conduit 210.

Turning now to the left end portion (Fig. 20) of section 206, this end of the manifold section is rotatively supported in a circular bearing member 240 carried by conduit 209. The inner race 242 of circular bearing 240 is mounted in a set position on the exterior of manifold section 206 while the outer race 244 of the bearing is mounted in a groove 246 of a mounting ring 248 carried by vertical conduit 209. A pair of conventional felt sealing rings 250 and 252, each of which is positioned in mounting ring 248 on opposite sides of groove 246, bear against the exterior of manifold section 206 to form a rotary type fluid seal for the unit. Mounting ring 248 of vertical conduit 209 is also used for supporting the right end portion of manifold section 205 by means of a rotary type mounting and fluid sealing means 254. As shown in the drawings, the details of the structure of the mounting and sealing means 254 is identical with that of the mounting and sealing means 220 and no useful purpose would be served by repeating the details of the structure all over again.

Turning now to manifold 202, it will be seen that the junction of opposite ends of each successive manifold section 205, 204 and 203 occurs in the area below one of the vertical conduits which carry the product of impactors 35 down to manifold 202 and each of the vertical conduits carry a mounting ring 256 and 258, respectively, which are of the same construction as mounting ring 248 and which as in the case of mounting ring 248 provide a rotary type fluid seal which accommodates expansion and contraction of the manifold sections as previously described hereinabove. Since the structure and functioning of mounting rings 256 and 258 are identical with that of mounting ring 248, the structure of mounting rings 256 and 258 will not be described in detail.

Referring now to mounting rings 248, 256 and 258 and to Figs. 18, 20 and 21 of the drawings, it will be seen that the mounting rings have a twofold purpose. The first purpose is as previously described to provide a flexible rotary type mount and fluid seal for the manifold sections and the second purpose of the mounting ring is to feed the low-pressure air and product of impactors 35 into manifold 202. Since the mounting rings bridge across the exterior of opposite end portions of the successive manifold sections 206, 205, 204 and 203 and since each section is of greater inside diameter than the preceding section, the mounting ring provides an annular passageway 260 between adjacent sections of manifold 202.

The vertical conduits 207, 208 and 209 are round on top immediately below floor F² and the shape of the round conduit is gradually changed and made elliptical to conform to passageway 260. In changing shape the cross-section area of each vertical conduit is preferably maintained substantially uniform throughout its length. (See Figs. 18 and 21.) By maintaining substantially uniform cross-section area throughout the length of the vertical conduits, abrupt changes in air velocity are avoided and this materially contributes to efficiency of operation. It is to be noted that the distance between F² and the common horizontal axis of the manifold sections is preferably kept uniform throughout the length of the axis for ease of installation.

In the preferred form of structure shown, the left end portion (Fig. 20) of each of the manifold sections 206, 205, 204 is extended into the open mouth of the adjacent section for a short distance beyond passageway 260 and as a result a throat 262 is formed between the exterior of the wall of one of the manifold sections and the interior wall of the adjacent section. Throats 262 assist in changing the direction of the entering air from vertical conduits 207, 208 and 209 to conform to that of the low-velocity air stream in manifold 202 so that the two streams of air are smoothly blended with a minimum of turbulence. As shown in Fig. 20, the lifting vanes 216 and 218 run the length of the individual manifold sections and they are so arranged that they will not interfere with rotation of the extended portion of the adjacent manifold section which forms throat 262.

As in the case of the form of my invention shown in Fig. 1, the left end portion (Fig. 18) of manifold 202 is connected to vertical conduit 34 by means of a bend 264. Bend 264 carries an annular flange 266 (Fig. 20) which in turn carries a circular bearing 268 which rotatively supports the left end portion of manifold 202 and the bearing provides a rotary type fluid seal for the manifold of identical construction with circular bearing 240. Since the structure of circular bearing 268 is the same as bearing 240 the details of the structure of circular bearing 268 will not be repeated. Bend 264 may be connected to vertical conduit 34 by any convenient means which provide a seal for the system such as the bolted flange member 270 shown in the drawings. It is to be noted that flange member 270 is of ordinary construction and there is no need for vibration dampers (118 and 135 Fig. 1) with the rotary type manifold of Fig. 18. In the preferred form of structure shown in Fig 18 a plurality of conventional guide vanes 272 are positioned in bend 264 which extend across between opposite sides of the wall of the bend and the vanes are positioned at an angle to the direction of flow of low-velocity air so that they assist in guiding the stream of air with suspended product therein around the 90° bend into vertical conduit 34. Guiding the air stream and product around the 90° bend in this way is important as it keeps the air moving in uniform flow and it tends to prevent product from settling out of the air stream and building up in the bend.

In Fig. 18 conduits 207, 208, 209 an 210 are shown as being substantially vertical but if desired the conduits may be provided with an obtuse bend as at 118 in Fig. 1 which may be of assistance in blending the air stream and suspended mill stock with the stream of air in manifold 186. As in the form of structure shown in Fig. 1 vertical conduit 175 is connected to manifold 202 near its dead end (Fig. 18) for the purpose of feeding air into the system from valve 182. If desired the vertical conduits 34, 207, 208, 209 and 210 may be grounded as illustrated in Fig. 1.

Figure 23:
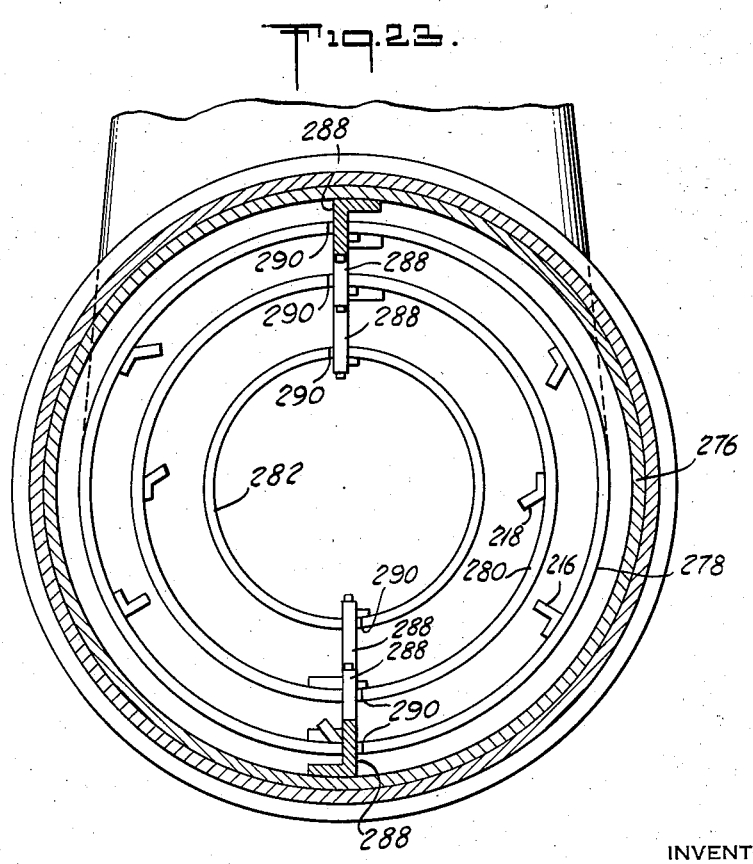
Figure 23 is taken on line 23—23 of Figure 22.

Another form of rotary type manifold 274 is shown in Figs. 22 through 24. As there shown, the structure of manifold 274 is identical with that of manifold 202 with the exception that the manifold sections 276, 278, 280 and 282 are all driven at the same speed (R. P. M.) by means of a single chain and sprocket drive 284 powered by motor 286. The chain and sprocket drive 284 causes manifold section 276 to rotate and this rotation is transmitted down the line to each successive manifold section 278, 280 and 282 as, for example, by means of a pair of flanges 288 positioned on opposite sides of the wall of the right end portion (Fig. 24) of the successive manifold sections 276, 278 and 280. A pair of slots 290 in the left end portion of each manifold section 278, 280 and 282 are adapted to receive flanges 288 and the slots cooperate with the flanges for transmitting the rotation. Otherwise the structure and operation of manifold 274 is the same as that previously described in connection with the manifold of Figs. 18 through 21.

This application is a continuation-in-part of my application Serial No. 507,687, filed May 11, 1955, for System and Apparatus for Pneumatic Milling, Conveying and Elevating of Mill Stock, now abandoned.

It will thus be seen that there has been provided in this invention a pneumatic system and apparatus in which the several objects heretofore set forth together with many thoroughly practical advantages are successfully achieved. The system and apparatus will be seen to be of a thoroughly practical character and well adapted to meet the varying requirements and conditions met with in practice. Also, in view of the foregoing disclosure, the practice of my invention in mill operation to achieve various of its advantages will be clear to those skilled in the art as well as its practice in conjunction with other mill operations and other mill product treatments, with accompanying corresponding apparatus such as for classifying, sieving, sifting, dust-collecting, etc.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. A system and apparatus for high velocity pneumatic impacting and low velocity pneumatic conveying and elevating of mill stocks comprising a vertical elevator conduit, a motor driven suction blower having means including a separator connecting its suction intake to the upper end of said conduit, a plurality of pneumatic impactors each comprising a closed chamber formed by coaxial separable upper and lower casing parts and each having at its lower end a discharge outlet with a control valve therefor and at its upper end a coaxial mill stock inlet, with a coacting air inlet for ingress of air to accelerate stock therein, leading to the coaxial intake of a velocity-increasing nozzle formed by two coaxial substantially conoidal surfaces of which one is at the under side of said upper casing part and the other is provided by an internal member supported coaxially below the latter and providing a peripherally continuous nozzle outlet for discharging air and stock at high velocity substantially radially outwardly, said chamber having therein and in the path of discharge from said nozzle outlet a coaxial cylindrical array of closely spaced removably mounted vertical targets to break up the stock by impact thereagainst, said chamber providing a substantial volume of space below the target array into which the high velocity air leaving the target array expands to materially reduce its velocity to a low value for low velocity exit, with stock particles suspended therein, through said discharge outlet, all of said impactor discharge outlets being connected, by respective pipes and at successive points, to a horizontal conduit of substantially progressively increasing cross section, said horizontal conduit having its large end connected by a bend to the lower end of said vertical conduit, vibration damping means interposed in said connecting pipes and between said bend and said vertical conduit, means associated with said horizontal conduit and said bend for effecting mechanical vibration of walls thereof against which stock particles impinge or deposit to impel stock particles back into suspension in the low velocity moving air, means for starting the motor of said suction blower to induce air flow in the system by air-intake through the air inlet of each of the impactors and means for starting said vibrating means to maintain stock particles in suspension in the low velocity air moving through said horizontal conduit and said bend, each of said impactor air-intakes comprising means for adjusting the effective air-intake opening to a value to effect air intake at the desired relatively high velocity for accelerating and impacting the stock, and controllable air-inlet means coacting with sad horizontal conduit for admission of compensating quantity of air thereto according as one or more of said impactor is cut out of the system, as by closing their control valves at their respective discharge outlets, and thereby substantially maintain the desired low velocity of air movement in said conduits.

2. A system and apparatus as claimed in claim 1 in which in order to lessen air velocity deceleration effects in said horizontal conduit and bend, said vibrating means is directional in action in that it has means coacting therewith to direct its effective working stroke at an angle to the direction of flow to provide a component of motion to impel said stock particles back into suspension in the low velocity moving air and a component to impel them in the direction of movement of said air.

3. A system and apparatus as claimed in claim 1 in which said horizontal conduit and said bend are connected together to form a unit and are provided with means oscillatably supporting said unit for oscillation substantially parallel to itself along a small arc which, on that oscillating stroke that is in the general direction of air flow in said horizontal conduit, provides a rise in the motion of the unit, thereby providing the walls thereof and against which said stock particles tend to impinge with components of motion one of which impels said particles back into suspension in the low velocity moving air and the other of which impels them in the general direction of movement of said air.

4. A system and apparatus as claimed in claim 1 in which said compensating air-inlet means has connection with said horizontal conduit means indirectly by way of one of said impactor discharge pipes, said connection being made to said pipe at a point on that side of vibration damping means that is remote from said horizontal conduit.

5. A system and apparatus as claimed in claim 4 in which said connection comprises a conduit that leads to a point adjacent said impactors where it is provided with a valve for controlling ingress of compensating air thereto.

6. A system and apparatus as claimed in claim 1 in which means are provided, in each impactor, for supporting said internal member for shifting its position vertically to change the spacing between said two nozzle-forming conoidal surfaces and thereby set the nozzle for the desired velocity-increasing action for impacting the mill stock, said supporting means being accessible upon separation of said upper and lower casing parts after closure of the control valve at the discharge outlet of the impactor to thereby cut out the latter from the pneumatic system.

7. A system and apparatus for high velocity pneumatic impacting and low velocity sub-atmospheric pressure pneumatic conveying of mill stocks comprising a conduit system having a horizontal conveying conduit, a motor driven suction blower having means including a separator connecting its suction intake to said conduit system at one point in the latter for induced airflow through said horizontal conduit, a plurality of pneumatic impactors each comprising a closed chamber formed by coaxial separable upper and lower casing parts and each having at its lower end a discharge outlet and at its upper end a coaxial mill stock inlet, with a coacting atmospheric air inlet for ingress of air to accelerate stock therein, leading to the coaxial intake of a velocity-increasing nozzle formed by two coaxial vertically spaced substantially conoidal surfaces of which the lower one is provided by an internal member having means supporting it coaxially below and spaced from the upper one, said two conoidal surfaces providing a peripherally continuous nozzle outlet for discharging air and stock at high velocity substantially radially outwardly, said chamber having therein and in the path of discharge from said nozzle outlet a coaxial cylindrical array of closely spaced targets to break up the stock by impact thereagainst, said chamber providing a substantial volume of space adjacent the target array into which the high velocity air leaving the latter expands to materially reduce its velocity to a low value for low velocity exit, with stock particles suspended therein, through said discharge outlet, said impactor discharge outlets being connected, by respective pipes and at successive points, to said horizontal conduit, the latter being of increasing cross section in the direction of air flow therein, means including vibration-damping means supporting said horizontal conduit relative to other portions of the conduit system, means associated with said horizontal conduit for effecting mechanical vibration of walls thereof against which stock particles impinge or deposit to impel the latter back into suspension in the low velocity moving air, each of said impactor air intakes comprising means for adjusting the effective air intake opening to a value to effect air flow at the desired relatively high velocity for accelerating and impacting the stock, means for cutting off said impactors individually from said horizontal conduit, and controllable air inlet means coacting with said horizontal conduit for admission of compensating air thereto according as one or more of said impactors is cut out of the system and thereby substantially maintain the desired low velocity of air movement in said horizontal conduit.

8. A high velocity pneumatic mill stock impactor for a low velocity sub-atmospheric pressure pneumatic system for conveying of mill stocks comprising a closed chamber formed by coaxial separable upper and lower casing parts and having at its lower end a discharge outlet adapted to be connected to the suction side of the system and at its upper end a coaxial mill stock inlet, with a coacting atmospheric air inlet for ingress of air to accelerate stock therein, leading to the coaxial intake of a velocity increasing nozzle formed by two coaxial vertically spaced substantially conoidal surfaces of which the lower one is provided by an internal member having means supporting it coaxially below and spaced from the upper one, said two conoidal surfaces providing a peripherally continuous nozzle outlet for discharging air and stock at high velocity substantially radially outwardly, said chamber having therein and in the path of discharge from said nozzle outlet a coaxial cylindrical array of closely spaced targets to break up the stock by impact thereagainst, said chamber providing a substantial volume of space adjacent the target array into which the high velocity air leaving the later expands to materially reduce its velocity to a low value for low velocity exit, with stock particles suspended therein, through said discharge outlet for entry into the low velocity suction side of the system, and said impactor air intake comprising means for adjusting the effective air intake opening in relation to the suction side of the system and to a value to effect air flow at the desired relatively high velocity for accelerating and impacting the stock.

9. A system and apparatus for low velocity sub-atmospheric pressure pneumatic conveying of mill stocks comprising a conduit system having a horizontal conveying conduit, a motor driven suction blower having means including a separator connecting its suction intake to said conduit system at one point in the latter for induced air flow through said horizontal conduit, such horizontal conduit being of increasing cross section in the direction of air flow therein and having connected thereto, at successive spaced points therealong, a plurality of pipes for receiving therefrom low velocity sub-atmospheric air with stock particles suspended therein for movement thereof in said horizontal conduit in the direction of induced air flow therein, means including vibration-damping means supporting said horizontal conduit relative to other portions of the conduit system, and means associated with said horizontal conduit for effecting mechanical vibration of walls thereof against which stock particles impinge or deposit to impel the latter back into suspension in the low velocity moving air, whereby to maintain substantial continuity of conveying of the mill stock, to said separator, by the air flow induced by said suction blower.

10. A high velocity pneumatic mill stock impactor for a low velocity sub-atmospheric pneumatic system for conveying and elevating mill stocks comprising a chamber formed by coaxial separable upper and lower casing parts and having at its lower end a discharge outlet adapted to be connected to the suction side of the system, said outlet having a control valve, a coaxial stock inlet at the upper end of said chamber, an air inlet adapted to coact with said stock inlet to supply an ingress of air substantially at atmospheric pressure for conveying the stock at accelerating velocity into the coaxial intake of a velocity increasing nozzle formed by two coaxial substantially conoidal surfaces of which one is at the under side of said upper casing part and the other is provided by an internal member supported coaxially below the latter and providing a peripherally continuous nozzle outlet for discharging air and stock at high velocity substantially radially outwardly, said nozzle outlet having spaced thereabout a coaxial cylindrical array of closely spaced removably mounted vertical targets against which said stock strikes to break up the stock by impact thereagainst, said target array being positioned adjacent the upper end of the chamber to provide a substantial volume of space below the target array and into which the high velocity air leaving the target array expands to materially reduce its velocity to a low value for low velocity exit, with stock particles suspended therein, through said discharge outlet, into the suction side of the system, said impactor air inlet comprising means for adjusting the effective air intake opening to a value related to the induced low velocity flow on the suction side of the system to effect air intake at a rate to provide the desired relatively high velocity for impacting the stock to break it up.

11. An impactor as claimed in claim 10 in which means are provided for supporting said internal member for shifting its position vertically to change the spacing between said two nozzle-forming conoidal surfaces and thereby change the velocity-increasing action of said nozzle, said supporting means being accessible upon separation of said upper and lower casing parts and said control valve at the discharge outlet of the impactor providing means for isolating the impactor from the suction side of the system to which said outlet is adapted to be connected and thereby permit separation of said two casing parts.

12. A high velocity pneumatic mill stock impactor for a low velocity sub-atmospheric pneumatic system for conveying and elevating mill stocks comprising a closed chamber formed by coaxial separable upper and lower casing parts and having at its lower end a discharge outlet adapted to be connected to the suction side of the system, said outlet having a control valve, a coaxial stock inlet at the upper end of said chamber with a coacting air inlet for ingress of air from the atmosphere to accelerate stock therein, leading to the coaxial intake of a velocity increasing nozzle formed by two coaxial substantially conoidal surfaces of which one is at the under side of said upper casing part and the other is provided by an internal member supported coaxially below the latter and providing a peripherally continuous nozzle outlet for discharging air and stock at high velocity substantially radially outwardly, said nozzle outlet having spaced thereabout a coaxial cylindrical array of closely spaced removably mounted vertical targets against which said stock strikes to break up the stock by impact thereagainst, said target array being positioned adjacent the upper end of the chamber to provide a substantial volume of space below the target array and into which the high velocity air leaving the target array expands to materially reduce its velocity to a low value for low velocity exit, with stock particles suspended therein, through said discharge outlet, into the suction side of the system, said impactor air inlet comprising means for adjusting the effective air intake opening to a value related to the induced low velocity flow on the suction side of the system to effect air intake at a rate to provide the desired relatively high velocity for impacting the stock to break it up and means for separating the lower casing part from the upper casing part by moving the former downward coaxially, said discharge outlet comprising coaxial telescoping upper and lower sleeve-like parts for maintaining the discharge passageway intact throughout vertical movement of the lower casing part and said control valve for the discharge outlet being associated with the lower casing part and with the upper telescoping part and, upon closure thereof, maintaining said discharge outlet closed throughout the range of movement of said lower casing part relative to the upper casing part.

13. An impactor as claimed in claim 12 in which said stock inlet comprises a stock spout and said coacting air inlet for ingress of air from the atmosphere comprises a sleeve-like element coaxial with and externally spaced from said stock spout to form an annular air passage therebetween, said sleeve-like element being open at that end thereof remote from the outlet end of the stock spout and thereby forming an annular air entry.

14. An impactor as claimed in claim 12 in which said air inlet comprises externally controllable relatively movable annular valve elements for setting air inflow in relation to the desired accelerating effect upon stock discharged from said spout and in relation to the velocity increasing action of said nozzle.

15. A system and apparatus for low velocity sub-atmospheric pressure pneumatic conveying of mill stocks comprising a conduit system having a vertical elevator conduit, a motor driven suction blower having means including a separator connecting its suction intake to the upper end of said vertical conduit for induced air flow in said conduit, a horizontal conduit of substantially progressively increasing cross section having its large end connected by a bend to the lower end of said vertical conduit, said horizontal conduit being connected, at successive spaced points therealong, to a plurality of pipes for receiving therefrom low velocity sub-atmospheric air with stock particles suspended therein for movement thereof in said horizontal conduit and through said bend in the direction of induced air flow therein, vibration-damping means interposed in said connecting pipes and between said bend and said vertical conduit, and means associated with said horizontal conduit and said bend for effecting mechanical vibration of walls thereof against which stock particles impinge or deposit to impel stock particles back into suspension in the low velocity moving air, whereby to maintain substantial continuity of conveying of the mill stock horizontally in said horizontal conduit and around said bend, to said vertical elevator conduit and to said separator, at the low velocity and low pressure air flow induced by said suction blower.

16. A system and apparatus as claimed in claim 15 in which in order to lessen air velocity deceleration effects in said horizontal conduit and bend, said vibrating means is directional in action in that it has means coacting therewith to direct its effective working stroke at an angle to the direction of flow to provide a component of motion to impel said stock particles back into suspension in the low velocity moving air and a component to impel them in the direction of movement of said air.

17. A system and apparatus as claimed in claim 15 in which said horizontal conduit and said bend are connected together to form a unit and are provided with means oscillatably supporting said unit for oscillation substantially parallel to itself along a small arc which, on that oscillating stroke that is in the general direction of air flow in said horizontal conduit, provides a rise in the motion of the unit, thereby providing the walls thereof and against which said stock particles tend to impinge with components of motion of one of which impels said particles back into suspension in the low velocity moving air and the other of which impels them in the general direction of movement of said air.

18. A system and apparatus as claimed in claim 17 in which said supporting means comprises a rigid supporting structure overlying and extending longitudinally of said horizontal conduit, a longitudinally extending frame structure having said horizontal conduit secured thereto, a plurality of pairs of link-like members having pivotal connections, at their respective upper and lower ends, with said rigid support structure and conduit-carrying frame structure, said vibration means being operative upon said frame structure and said link-like members, in their respective pairs, extending downwardly from said rigid support structure and at an inclination in the direction of low velocity air flow in said horizontal conduit.

19. A system and apparatus as claimed in claim 18 in which said link-like members have, at their pivotal connections, torsion elements that yield in torsion during oscillation of said frame structure conduit-and-bend unit whereby said link-like members partake of the form of cantilevers which, in at-rest position of said frame structure, coact to maintain said directional inclination of said members with the lower ends thereof substantially at the mid point of the arc of said oscillating strokes.

20. A system and apparatus as claimed in claim 15 in which said horizontal conduit, to achieve said increasing cross section thereof, is tapered and has its longitudinal axis inclined upwardly in the direction toward said bend, whereby the angle of the bend is less than 90 degrees.

21. A system and apparatus as claimed in claim 18 in which the vibration-damping means interposed between said bend and said vertical conduit comprises coupling elements respectively secured thereto with an elastomer element interposed between said coupling elements and forming together a yieldable coupling between said bend and said vertical conduit, the plane of said coupling making an angle of substantially 90 degrees to the plane of inclination of the pairs of said link-like members.

22. A system and apparatus as claimed in claim 18 in which said plurality of connecting pipes connect to said horizontal conduit from above the latter and at an inclination substantially the same as said directional inclination of said pairs of link-like members, the vibration-damping means interposed in said coupling pipes comprising two flange-like pipe-coupling elements with a ring-shaped elastomer element interposed therebetween, the general plane of the resultant yieldable coupling extending at substantially 90 degrees to the direction of inclination of the planes of said pairs of link-like members.

23. A system and apparatus as claimed in claim 9 in which said plurality of pipes have associated therewith respective means for discontinuing flow of low velocity air with stock particles suspended therein to said horizontal conduit, with controllable air inlet means connected with said horizontal conduit for admission of compensating air thereto according as flow in one or more of said pipes is discontinued and thereby substantially maintain the desired low velocity of air movement in said conduits.

24. A system and apparatus for high velocity pneumatic impacting and low velocity sub-atmospheric pneumatic conveying and elevating of mill stocks comprising a vertical elevator conduit, a motor driven suction blower having means including a separator connecting its suction intake to the upper end of said conduit, a plurality of pneumatic impactors each comprising a closed chamber formed by coaxial upper and lower casing parts with means mounting the lower casing part for coaxial movement of separation relative to the upper casing part, the lower casing part having at its lower end a discharge outlet and the upper casing part having a coaxial stock inlet, with a coacting air inlet for ingress of air thereto, leading to the coaxial intake of a velocity increasing nozzle formed by two coaxial substantially conoidal surfaces of which one is under said upper casing part and the other is provided by an internal coaxial member positioned below the latter and providing a peripherally continuous nozzle outlet for discharging air and stock at high velocity substantially radially outwardly, said upper casing having a depending spider-like frame that enters into the upper part of said chamber, said frame having an apertured central hub with means coacting with the latter to support said internal member in the position aforesaid and having a ring-like support which coacts to support coaxially a cylindrical array of closely spaced vertical targets positioned in the path of high velocity air and stock discharged from said nozzle outlet to break up the stock by impact thereagainst with the air leaving the target array to expand into the substantial volume of space below the target array and thereby materially reduce its velocity to a low value for low velocity exit, with stock particles suspended therein, through said discharge outlet, all of said impactor discharge outlets being connected for substantially downward discharge into a substantially horizontal conduit of substantial cross section and connected at its one end, through a conduit bend, to the lower end of said vertical conduit to induce air intake at the aforesaid air inlets of said impactors, with means for subjecting said horizontal conduit and bend to vibration to impel stock particles that impinge thereagainst back into suspension in the low velocity air to maintain substantial continuity of induced air intake at said air inlets, each of said impactor air inlets comprising means for adjusting the effective air intake opening to a value to effect induced air intake at the desired relatively high velocity for accelerating the stock relative to said target array, valve means for closing off induced air flow between said impactors and said horizontal conduit, and means connected to the other end of said horizontal conduit for adjustable air ingress thereto according as one or more of said impactors is closed off from the system and thereby substantially maintain the desired sub-atmospheric pressure low velocity of movement, in said conduits, of air with stock particles suspended therein.

25. A system and apparatus as claimed in claim 24 in which said means coacting with said central hub comprises means coacting with the aperture in said hub for shifting the vertical position of said internal coaxial member relative to said first conoidal surface and thereby change the velocity characteristics of said nozzle in relation to said induced air flow and relative to said air inlet, said means of any said impactors being accessible upon closing off of induced air flow between the impactor and said horizontal conduit and upon effecting separating movement of said lower casing part relative to said upper casing part.

26. A system and apparatus as claimed in claim 25 in which said means coacting with said apertured central hub member comprises a stud-like element received in the aperture of said hub member and supporting said coaxial internal member at its upper end, with threaded means coacting between said stud member and said hub member adapted upon relative rotary movement to shift the relative vertical position as aforesaid.

27. A system and apparatus as claimed in claim 26 in which said stud-like member is slidably received at its lower end in the aperture of said hub member and has a threaded portion with a nut thereon resting against the upper end of the hub member, the portion of the stud member above said threaded portion thereof being of lesser diameter to freely receive thereon said nut when unthreaded from said stud member whereby to let the latter descend in said aperture to bring said internal coaxial member to rest upon said spider-like frame.

28. A system and apparatus as claimed in claim 27 in which the connection between said stud member and said internal coaxial member comprises means forming a detachable connection whereby, with said internal member resting upon said spider-like frame, said stud member may be detached and withdrawn downwardly through said hub aperture, the spacing between the arms of said spider-like frame being sufficient relative to the dimensions of said internal coaxial member for the passage of the latter therethrough.

29. A system and apparatus as claimed in claim 24 in which said targets are substantially right angled parallelopipeds of a length substantially twice as great as the vertical dispersion of air and stock discharge from said nozzle, said ring-like support positioning them with substantially one half of their respective faces that face toward said nozzle outlet in the path of said discharge and said ring support having means coacting therewith for releasably and removably holding said target members in position whereby, upon closing off of induced air flow between the impactor and said horizontal conduit and upon effecting separating movement of said lower casing part relative to said upper casing part, said target members may be released and turned upside down to present the other half of each of said faces to the nozzle discharge to present unworn surfaces and edges to the latter and also to permit said target members to turn about their respective vertical axes to present halves of other faces thereof to said discharge.

30. A system and apparatus as claimed in claim 29 in which said ring support and its coacting means provide respective pairs of upper and lower seats for receiving the upper and lower ends of said targets with releasable clamping means operating upon the target members to hold them in their respective seats.

31. A high velocity pneumatic mill stock impactor for a low velocity sub-atmospheric pneumatic system for conveying of mill stocks comprising a closed chamber formed by coaxial upper and lower casing parts with means mounting the lower casing part for coaxial movement of separation relative to the upper casing part, the lower casing part having at its lower end a discharge outlet for connection to said system and the upper casing part having a coaxial stock inlet, with a coacting air inlet for ingress of air thereto, leading to the coaxial intake of a velocity-increasing nozzle formed by two coaxial substantially conoidal surfaces of which one is under said upper casing part and the other is provided by an internal coaxial member positioned below the latter and providing a peripherally continuous nozzle outlet for discharging air and stock at high velocity substantially radially outwardly, said upper casing part having a depending spider-like frame that enters into the upper part of said chamber, said frame having an apertured central hub with means coacting with the latter to support said internal member in the position aforesaid and having a ring-like support which coacts to support coaxially a cylindrical array of closely spaced vertical targets positioned in the path of high velocity air and stock discharged from said nozzle outlet to break up the stock by impact thereagainst with the air leaving the target array to expand into the substantial volume of space below the target array and thereby materially reduce its velocity to a low value for low velocity exit, with stock particles suspended therein, through said discharge outlet, said impactor air inlet comprising means for adjusting the effective air intake opening to a value relative to the air induction effect of the system connectable to said discharge outlet to effect induced air intake through said air inlet at the desired relatively high velocity for accelerating the stock relative to said target array.

32. An impactor as claimed in claim 31 in which said means coacting with said central hub comprises coacting with the aperture in said hub for shifting the vertical position of said internal coaxial member relative to said first conoidal surface and thereby change the velocity increasing characteristics of said nozzle in relation to said induced air flow and relative to said air inlet, said last mentioned means being accessible upon closing off of the impactor at its discharge end and upon effecting separating movement of said lower casing part relative to said upper casing part.

33. An impactor as claimed in claim 32 in which said means coacting with said apertured central hub member comprises a stud-like element received in the aperture of said hub member and supporting said coaxial internal member at its upper end, with threaded means coacting between said stud member and said hub member adapted upon relative rotary movement to shift the relative vertical position as aforesaid.

34. An impactor as claimed in claim 33 in which said stud-like member is slidably received at its lower end in the aperture of said hub member and has a threaded portion with a nut thereon resting against the upper end of the hub member, the portion of the stud member above said threaded portion thereof being of lesser diameter to freely receive thereon said nut when unthreaded from said stud member whereby to let the latter descend in said aperture to bring said internal coaxial member to rest upon said spider-like frame.

35. An impactor as claimed in claim 34 in which the connection between said stud member and said internal coaxial member comprises means forming a detachable connection whereby, with said internal member resting upon said spider-like frame, said stud member may be detached and withdrawn downwardly through said hub aperture, the spacing between the arms of said spider-like frame being sufficient relative to the dimensions of said internal coaxial member for the passage of the latter therethrough.

36. An impactor as claimed in claim 31 in which said targets are substantially right angled parallelopipeds of a length substantially twice as great as the vertical dispersion of air and stock discharge from said nozzle, said ring-like support positioning them substantially one half of their respective faces that face toward said nozzle outlet in the path of said discharge and said support ring having means coacting therewith for releasably and removably holding said target members in position whereby, upon closing off of air flow through said impactor and upon effecting separating movement of said lower casing part relative to said upper casing part, said target members may be released and turned upside down to present the other half of each of said faces to the nozzle discharge to present unworn surfaces and edges to the latter or to permit said target members to be turned about their respective vertical axes to present halves of other faces thereof to said discharge.

37. An impactor as claimed in claim 36 in which said ring support and its coacting means provide pairs of upper and lower seats for receiving the upper and lower ends of said targets, with releasable clamping means operating upon the target members to hold them in their respective seats.

38. Apparatus for impacting and pneumatic conveying of mill stock which includes a manifold arranged for horizontal conveying of mill stock, a motor driven suction blower, means for connecting the suction intake of the blower to said manifold to induce air to flow therein, said horizontal manifold being of increasing cross sectional area in the direction of air flow therein, a plurality of impactors for breaking up mill stock adapted to supply impacted mill stock and air to the outlets thereof, pipes connecting the outlets of said impactors to the manifold at successive spaced points along the length thereof for delivery of air and mill stock into the said manifold and means for moving the wall of the manifold to effect resuspension in air of mill stock which may settle out in the bottom of the manifold.

39. A structure as specified in claim 38 which includes means associated with said manifold for effecting vibration of the wall of such manifold to effect resuspension in air of mill stock that may settle out in the bottom of the manifold and which includes vibration-damping means supporting said manifold relative to other portions of said apparatus.

40. A structure as specified in claim 38 which includes means for rotating the manifold to effect resuspension in air of mill stock that may settle out in the bottom of the manifold.

41. A structure as specified in claim 38 which includes an air intake associated with said manifold and means for controlling the air intake to maintain air flow in the manifold at the desired rate of speed.

42. A system and apparatus for high velocity pneumatic impacting and low velocity pneumatic conveying and elevating of mill stocks comprising a vertical elevator conduit, a motor driven suction blower having means including a separator connecting its suction intake to the upper end of said conduit, a plurality of pneumatic impactors each comprising a closed chamber formed by coaxial separable upper and lower casing parts and each having at its lower end a discharge outlet with a control valve therefor and at its upper end a coaxial mill stock inlet, with a coacting air inlet for ingress of air to accelerate stock therein, leading to the coaxial intake of a velocity-increasing nozzle formed by two coaxial substantially conoidal surfaces of which one is at the underside of said upper casing part and the other is provided by an internal member supported coaxially below the latter and providing a peripherally continuous nozzle outlet for discharging air and stock at high velocity substantially radially outwardly, said chamber having therein and in the path of discharge from said nozzle outlet a coaxial cylindrical array of closely spaced removably mounted vertical targets to break up the stock by impact thereagainst, said chamber providing a substantial volume of space below the target array into which the high velocity air leaving the target array expands to materially reduce its velocity to a low value for low velocity exit, with stock particles suspended therein, through said discharge outlet, all of said impactor discharge outlets being connected, by respective pipes and at successive points, to a horizontal conduit of substantially progressively increasing cross section, said horizontal conduit having its large end connected by a bend to the lower end of said vertical conduit, means for moving the wall of said horizontal conduit to resuspend in air mill stock which may have settled out in the bottom of the horizontal conduit, means for starting the motor of said suction blower to induce air flow in the system by air intake through the air inlet of each of the impactors, each of said impactor air-intakes comprising means for adjusting the effective air-intake opening to a value to effect air intake at the desired relatively high velocity for accelerating and impacting the stock, and controllable air-inlet means coacting with said horizontal conduit for admission of compensating quantity of air thereto as one or more of said impactors is cut out of the system, as by closing their control valves at their respective discharge outlets, and thereby substantially to maintain the desired low velocity of air movement in said conduits.

43. A structure as specified in claim 42 in which said bend connecting the horizontal conduit with the vertical conduit includes directional vanes for guiding air and mill stock around the bend.

44. In pneumatic conveying of mill stock, apparatus comprising a manifold with cross-section area of increasing size having its large end connected to a vertical conduit adapted to receive air with mill stock suspended therein from said manifold, a plurality of impactors for breaking up mill stock adapted to supply impacted mill stock and air to the outlets thereof, conduits connecting the outlets of said impactors to the manifold at successive spaced points along the length thereof for delivery of air and mill stock into the said manifold, said manifold comprising a plurality of separate sections for conveying mill stock in horizontal direction, means for providing a fluid seal between successive manifold sections, a motor driven suction blower, means for connecting the suction intake of the blower to said manifold to induce air to flow therein, means for rotating the wall of the manifold to effect resuspension in air of mill stock that may have settled in the bottom of said manifold whereby such provision for resuspension of mill stock in air assists in making possible the use of air of lower velocity than that ordinarily required for horizontal pneumatic conveying of mill stock in stationary type conduits.

45. In pneumatic conveying of mill stock apparatus for low velocity sub-atmospheric pressure pneumatic conveying of mill stock comprising a manifold with cross-section area of increasing size having its large end connected to a vertical conduit adapted to receive air with mill stock suspended therein from said manifold, a plurality of impactors for breaking up mill stock adapted to supply impacted mill stock and air to the outlets thereof, conduits connecting the outlets of said impactors to the manifold at successive spaced points along the length thereof for delivery of air and mill stock into the said manifold, said manifold comprising a plurality of separate sections for conveying millstock in horizontal direction, means for providing a rotary type fluid seal between successive manifold sections, a motor driven suction blower, means for connecting the suction intake of the blower to said manifold to induce air to flow therein, means for rotating the wall of the manifold to effect resuspension in air of mill stock that may have settled out in the bottom of said manifold whereby such provision for resuspension of mill stock in air assists in making possible the use of lower velocity than that ordinarily required for horizontal pneumatic conveying of mill stock in stationary type conduits.

46. A structure as specified in claim 45 in which the means for rotating the wall of the manifold includes a drive shaft separately connected with each individual manifold section so that each section may be rotated at a different speed.

47. A structure as specified in claim 45 in which the means for rotating the wall of the manifold includes a drive-shaft connected with at least one of said manifold sections and which includes means for connecting successive manifold sections together so that rotation of one of the sections will be transmitted to other sections of the manifold.

48. A structure as specified in claim 47 in which the means for connecting the manifold sections together include a flange mounted on one end portion of a manifold section and a slot adapted to receive such flange positioned in the end portion of an adjacent manifold section.

49. A structure as specified in claim 45 which includes a bend which connects the manifold with its discharge conduit and in which the bend includes vanes for directing the air with product suspended therein around the bend.

50. A structure as specified in claim 45 in which lifting vanes are positioned on the interior wall of the manifold sections to assist in carrying mill stock up the side of the wall of the manifold for resuspension in air flowing through the manifold.

51. A structure as specified in claim 50 in which the angle which the lifting surface of some of the vanes makes with the wall of the manifold is different from that of other vanes whereby the angle of repose of mill stock on successive vanes will be different so that mill stock will be fed back into the air stream at different points to achieve more widespread redistribution of mill stock in air.

52. In pneumatic conveying of mill stock, apparatus comprising a manifold made up of a plurality of separate sections adapted to convey mill stock in horizontal direction, a plurality of impactors for breaking up mill stock adapted to supply impacted mill stock and air to the outlets thereof, conduits connecting the outlets of said impactors to the manifold at the junction between adjacent manifold sections, means for connecting said conduits to the junction between adjacent manifold sections, said means being adapted to receive mill stock and air from the said conduits and to provide a passageway for such mill stock and air leading into the manifold in the area of the junction between adjacent manifold sections, a motor driven suction blower, means for connecting the suction intake of the blower to said manifold to induce air flow therein means for rotating the wall of the manifold sections to resuspend in air mill stock which may have settled out in the bottom of the manifold sections, whereby such provision for resuspension of mill stock in air assists in making possible the use of air of lower velocity than ordinarily required for horizontal pneumatic conveying of mill stock in stationary type conduits.

53. A structure as specified in claim 52 in which the cross-section area of each successive manifold section in the direction of air travel is larger than the preceding manifold section.

54. A structure as specified in claim 53 in which the increase in the cross-section area of the successive manifold sections is at least equal to the cross-section area of the conduit which feeds into the junction between adjacent manifold sections.

55. A structure as specified in claim 53 in which one end portion of the manifold sections is extended in the direction of air travel into the interior of the adjacent larger manifold section where it projects beyond the passageway of the fluid sealing means and cooperates with the interior surface of the larger manifold section to provide a throat for feeding mill stock and air from said passageway into the manifold section in the direction of air travel.

56. A pneumatic conveying of mill stock apparatus comprising a manifold made up of a plurality of manifold sections, each of said sections in the direction of air travel being of larger cross-section area than the preceding manifold section, a plurality of impactors for breaking up mill stock adapted to supply impacted mill stock and air to the outlets thereof, means carried by each of said conduits for rotatively supporting said manifold sections adapted to provide a fluid seal at the junction between adjacent manifold sections and said means being further adapted to provide a passageway into the manifold in the area of the junction between adjacent manifold sections, conduits connecting the outlets of said impactors to the said means which provide a passageway into the manifold for delivery of air and impacted mill stock into the said manifold, a motor driven suction blower, means for connecting the suction intake of the blower to said manifold to induce air flow therein and effect the conveying of mill stock in said manifold sections, means for rotating the wall of the manifold sections to resuspend in air mill stock which may have settled out in the bottom of the manifold sections, whereby such provision for resuspension of mill stock in air assists in making possible the use of air of lower velocity than that ordinarily required for horizontal pneumatic conveying of mill stock in stationary type conduits.

57. A structure as specified in claim 56 which includes an air intake open to the atmosphere which is associated with said manifold and means for controlling the air intake to maintain air flow in the manifold at the desired rate of speed.

58. A structure as specified in claim 56 which includes a conduit for receiving air and suspended mill stock from said manifold for vertical conveying of air and mill stock to a separator, and means for connecting such conduit to the large end of the manifold.

59. A structure as specified in claim 58 in which the connecting means between the vertical conduit and manifold includes vanes which assist in directing the air and mill stock into the vertical conduit.

60. A structure as specified in claim 56 which includes means for rotating each manifold section separately and at a different rate of speed from that of adjacent manifold sections.

61. Apparatus for impacting and sub-atmospheric pneumatic conveying of mill stock which includes a manifold arranged for horizontal conveying of mill stock, a motor driven suction blower, means for connecting the blower exhaust with the atmosphere, means for connecting the suction intake of the blower to said manifold to induce air flow through said manifold at sub-atmospheric pressure, a plurality of impactors for breaking up the mill stock adapted to supply impacted mill stock and air to the outlet thereof, pipes connecting the outlet of said impactors to the manifold at successive spaced points along the length thereof for delivering air and mill stock into the said manifold and means for moving the wall of the manifold to effect resuspension in air of mill stock which may settle out in the bottom of the manifold.

62. A system and apparatus for high velocity pneumatic impacting and low velocity pneumatic conveying of mill stock which includes a manifold arranged for horizontal conveying of mill stock, a motor driven suction blower, means for connecting the suction intake of the blower to said manifold to cause a flow of air therein, a plurality of pneumatic impactors, pipes connecting the outlet of said impactors to the manifold at successive spaced points along the length thereof, each of said impactors having a closed chamber with an inlet for air and mill stock leading to a velocity-increasing nozzle positioned within said chamber for accelerating the air and mill stock, means for supplying mill stock to the inlet of said chamber, means for supplying air to said inlet to mix with the entering mill stock, said nozzle having an outlet for discharging air and mill stock into said chamber, targets positioned in said chamber in the path of the discharge of said nozzle to break up the mill stock upon impact, said chamber having a space below the targets into which the air with impacted mill stock particles therein may expand to reduce its velocity below that at which impacting occurred before passing through the outlet pipes into the said horizontal manifold, said horizontal manifold being of increasing cross sectional area in the direction of air flow therein, and means for moving the wall of the manifold to effect resuspension in air of mill stock that may settle out in the bottom of the manifold.

References Cited in the file of this patent

UNITED STATES PATENTS

| | | |
|---|---|---|
| 893,968 | Allington | July 21, 1908 |
| 2,022,585 | Chance | Nov. 26, 1935 |
| 2,194,026 | Mandle | Mar. 19, 1940 |
| 2,549,033 | Tyrner | Apr. 17, 1951 |
| 2,624,517 | Smith | Jan. 6, 1953 |

FOREIGN PATENTS

| | | |
|---|---|---|
| 501,907 | Germany | July 7, 1930 |
| 895,723 | Germany | Nov. 5, 1953 |